US012490047B1

(12) United States Patent
Miller et al.

(10) Patent No.: US 12,490,047 B1
(45) Date of Patent: Dec. 2, 2025

(54) SYSTEM AND METHOD TO INCREASE REPRESENTATIVITY OF HUMAN MOVEMENT AND SPEND DATA FOR ANALYTICS PURPOSES THROUGH MULTI-DIMENSIONAL DATA-BALANCING

(71) Applicant: Zartico, Inc., Salt Lake City, UT (US)

(72) Inventors: John Miller, Kansas City, MO (US); Alexandra V. Pasi, South Jordan, UT (US); Robert Polski, Salt Lake City, UT (US)

(73) Assignee: Zartico, Inc., Salt Lake City, UT (US)

( * ) Notice: Subject to any disclaimer, the term of this patent is extended or adjusted under 35 U.S.C. 154(b) by 0 days.

(21) Appl. No.: 19/227,043

(22) Filed: Jun. 3, 2025

Related U.S. Application Data

(60) Provisional application No. 63/655,989, filed on Jun. 4, 2024.

(51) Int. Cl.
| | |
|---|---|
| *H04W 4/00* | (2018.01) |
| *H04W 4/02* | (2018.01) |
| *H04W 4/021* | (2018.01) |
| *H04W 72/0453* | (2023.01) |
| *H04W 72/51* | (2023.01) |

(52) U.S. Cl.
CPC ........... *H04W 4/021* (2013.01); *H04W 4/023* (2013.01); *H04W 72/0453* (2013.01); *H04W 72/51* (2023.01)

(58) Field of Classification Search
CPC ..... H04W 4/021; H04W 4/023; H04W 72/51; H04W 72/0453
See application file for complete search history.

(56) References Cited

U.S. PATENT DOCUMENTS

| | | | |
|---|---|---|---|
| 2022/0286956 A1* | 9/2022 | Xiao | H04W 48/18 |
| 2024/0214769 A1* | 6/2024 | Mizes | H04W 4/029 |

* cited by examiner

*Primary Examiner* — Erika A Washington
(74) *Attorney, Agent, or Firm* — Woodard, Emhardt, Henry, Reeves & Wagner LLP

(57) ABSTRACT

A system and method for normalizing device counts from recorded device observation data has been developed. The observation data includes locations of the devices recorded at various points in time. The system normalizes the device counts to account for devices that are not accurately represented in the data. The method includes calculating a probability that a device is observed at a location based on the observation frequency of the device and the dwell time at that location. The method further includes calculating a normalization factor based on the population of the geographic region that the device is located. In one example, the method further includes calculating a number of visitor devices and/or a number of overnight visitors at a location.

20 Claims, 12 Drawing Sheets

700

705 — Dividing device observation data based on frequency of observation

710 — Organizing the devices based on home county

715 — Increasing the normalized device count at a POI based on device count for a middle frequency group 720 — Increasing the normalized device count at a POI based on the combined device count for the middle frequency group and a high frequency group 725 — Increasing the normalized device count at a POI based on device count for the high frequency group 730 — Calculating a raw device factor based on the amounts the device count increases and the observed device counts of the frequency groups

FIG. 7

SYSTEM AND METHOD TO INCREASE REPRESENTATIVITY OF HUMAN MOVEMENT AND SPEND DATA FOR ANALYTICS PURPOSES THROUGH MULTI-DIMENSIONAL DATA-BALANCING

CROSS REFERENCE TO RELATED APPLICATIONS

This application claims the benefit of U.S. Patent Application No. 63/655,989, filed Jun. 4, 2024, which is hereby incorporated by reference.

BACKGROUND

Recently, there has been an explosion in the use of geolocation data for a wide variety of purposes. For example, geolocation data can be used to spot trends, such as to determine popular locations, as well as for other purposes. Like in most cases, data reliability and accuracy is always a concern.

Thus, there is a need for improvement in this field.

SUMMARY

Geolocation data is used in a variety of applications such as to estimate attendance at events, observe traffic in cities, plan public projects, and/or predict fluctuations in population among other examples. Geolocation data is typically obtained from various user devices, including smartphones, laptops, fitness devices, GPS systems, and/or other types of devices. In some cases, location data of a user is recorded through one or more applications on such a device. For example, social media, navigation, ride-sharing, fitness, and/or other types of applications can record user location data. Often times, location data is recorded in different ways depending on the type of application and/or device recording the user location. For example, certain applications may only record data when in use, some applications may continuously record location data while running in the background, and/or some applications may require a user to enable location sharing permission before recording data. Additionally, some businesses that oversee, maintain, and/or operate such applications and/or devices sell such location data to other entities, such as governments and/or other businesses. In some cases, as a part of aggregating such data, the quality of the location data is affected in various ways.

In travel and tourism industries, it is valuable to observe the behavior of visitors to understand trends, such as popular travel locations, active times of day, locations where visitors spend the most time, and/or other insights. Due to the popularity of smart phones and other such devices, information about visitor behavior has become more accessible. Such devices and other technologies can record location data of users, such as through global positioning system (GPS), cell tower information, and/or other sources. To accurately analyze visitor behavior, it is useful to distinguish users who spend time in and interact with a location from users who are simply passing through the location. Oftentimes, location data is not a fully accurate representation of the behavior of the users. Some data is recorded through apps on the device, which may sample location data in inconsistent intervals and/or only when the app is running. Some data is collected by third party services who may process the location data in various ways. Further, privacy laws in different regions may affect when and where location data is recorded by a device. Such factors may cause certain devices to be unobserved for periods of time, unobserved at certain locations, and/or observed at a location for an inaccurate amount of time. As a result, location data may incorrectly represent user behavior at various geographic locations and/or at various points in time.

A unique system has been developed for normalizing user location data to remove such inaccuracies in the data. The system is configured to statistically counterbalance factors that impact the accuracy of location data, such as location sampling frequency, third party data processing, privacy laws, and behavior of certain demographics as examples. The system normalizes location data irrespective of the sources of deviation and variation in the data. Therefore, the system is robust to changes in the way location data is recorded by devices and/or processed by third parties. Additionally, the system is configured to determine the number of visitors in a particular location, such as at a specific point of interest (POI), in a county, at a party boundary, and/or in another geographic area. The system determines the number of visitors by day, month, week, and/or over another time period. Normalizing the data facilitates accurately determining the visitor count. Generally, the system uses a technique that normalizes the data based on dwell time of the devices at a POI. In one version, the technique adjusts the location data to account for undercounted devices, such as devices that are not observed due to short dwell times at a POI for example.

In one embodiment, the system generally includes a computer, a network, and user devices. The computer is generally configured to read and analyze data. The computer includes a processor and memory. The processor is configured to execute one or more algorithms, calculations, programs, and/or other actions to analyze and/or modify data from the users. The memory is configured to store such algorithms and/or user data. In one example, the computer is a remote server and/or a network of computers. Alternatively, the computer can be a personal computer or similar device. The computer and the user devices are communicatively connected to the network. In one example, the network includes the Internet, a cellular network, a mobile network and/or another type of network. The user device can include a mobile phone, personal computer, navigational device, and/or other types of devices. Typically, the user device runs software, such as an app and/or another program, that records and/or communicates location data to the network. In one example, the user devices send information directly to the computer over the network. In another example, a third-party data broker collects location data from the user devices and sends the data to the computer. The third-party broker system generally includes one or more computers, such as a remote server and/or a database. In one example, the third-party broker processes the location data in some way, such as rounding the time of a location observation, rounding the location of the observation, labeling the data, filtering the data, and/or modifying the data in other ways.

The system is generally configured to perform a method for normalizing location data from the users. In one example, the computer performs the steps of the method. Generally, various parts of the computer perform appropriate stages of the method. For example, the processor and the memory may each perform parts of the method. In one instance, the method is stored and executed through software on the computer. In an alternate example, one or more parts of the method are performed by the third-party broker, the user device, and/or another device in the system. The method typically includes normalizing location data based on dwell times of the users. Further, the method typically includes determining a number of visitor devices in a geographic area, such as within a county and/or at a POI as examples. The method is generally described for processing data on a daily basis. As should be appreciated, the system is configured to perform the method in a variety of time intervals, such as on a weekly, monthly, and/or another basis.

The location data includes device observations that specify the time and location at which the device is observed. In one example, an app on the user device automatically records periodic observations. In another example, the app only records an observation when the user opens or actively interacts with the app. In yet another example, the user device records an observation when pinged by a server, such as the third-party broker and/or another device. The location data further includes information about the user and/or the device, such as a home location, type of device, demographic information, and/or other types of information. In one example, the observations are analyzed by geographic region, such as by county, census tract, zip code, city, and/or party boundary as examples. Further, the observations are typically analyzed by POI. The POI is generally a smaller area than the geographic region, such as a specific landmark, building, park, neighborhood, event space, and/or other area within the region.

In one version, the system calculates a probability of a device being observed at a POI. The probability is determined for a given dwell time of a device at the POI. In one example, the devices are organized into groups based on frequency of observation. For example, each device is assigned to a device observation group (DOG) based on the number of times the device is observed in a given day. A device observed many times in the day is generally placed in a high-frequency group, while a device observed a few times in the day is placed in a low-frequency group. The system can arrange the devices into any number of DOGs, for example ten DOGs. To determine the probability of the device being observed, the system determines a probability function that varies with device dwell time and the observation frequency of the device. Typically, the system determines a probability function for each DOG. In one version, the probability function is an interpolation of multiple functions, such as three different probability functions for example. In another version, the probability function is based on a probability of the device being observed at the POI during a given hour in the day. For instance, the system determines the probability function using a cubic interpolation of the probabilities across the whole day which varies with device dwell time.

The method further includes calculating a normalization factor. In one version, a simple normalization factor is determined based on the population data and the number of devices observed in a geographic area. In one example, the population data is census data for a county, zip code, and/or city. The number of devices observed in the geographic area is determined on a daily, weekly, monthly, and/or other basis. Because population data is relatively constant over such periods, using population data to determine the normalization factor helps to remove fluctuations in the data from a variety of causes. The system then normalizes the device observation data based on the normalization factor and the probability of the device being at a POI. In one version, the system applies the normalization factor to each device observation for a POI and/or other geographic area. The system further aggregates the probabilities of each device being observed in the POI for all devices in the POI.

By normalizing the data this way, the system counterbalances variations in the data that are caused by devices going unobserved at a POI, for example because of low dwell time and/or low observation frequency.

In another version, a weighted normalization factor is determined based on an expected device count at each POI. The system assigns an average dwell time for devices to each POI. Then the system calculates an expected device count at each POI based on the probability of a device being observed at the POI. In one example, the system determines an expected device count based on an average number of observed devices for each possible daily observation frequency. The average number of observed devices can be determined on a daily, monthly, and/or other time basis. Further, the average number is determined by the home county and/or other geographic region of the user. The system then determines the normalization factor using the expected device count and population data for the geographic region. By weighting based on the observation frequency, the system more accurately normalizes the data across each observation group. For example, the system accounts for low observation frequency devices that may go unobserved without inflating high observation frequency device counts.

The method further includes adjusting location data to account for devices with underrepresented sample frequencies. In one version, the system divides the devices into similarly sized groups based on observation frequency. For instance, the system may combine DOGs into larger groups. In one example, the system divides the devices into three groups: a low-frequency group, a middle-frequency group, and a high-frequency group. The system determines a proportion of the total device count that is in each frequency group. For instance, the proportion can be determined for each county and/or another geographic region. The proportions are pre-determined and/or calculated based on data over a month and/or another period of time. The system then determines a device count in each group for the day at each POI. After determining the device counts, the system determines a ratio between the device count in the frequency group and the total device count at the POI. To check if devices are underrepresented, the system compares the proportion for a frequency group to the ratio for that frequency group. If the ratio is greater than the proportion, the system adds devices to the total device count. For instance, the number of added devices can be half of the number needed to make the ratio equivalent to the proportion. In one example, the system compares the ratio and the proportion for the middle-frequency group first. The system then compares the ratio and the proportion of the high-frequency group. In one version, the system directly compares the ratio and the proportion of the high-frequency group. In another example, the system combines the ratios from the middle-frequency and the high-frequency groups into a combined ratio. Similarly, the system combines the proportions from the middle-frequency and the high-frequency groups into a combined proportion. In such an example, the system compares the combined ratio and the combined proportion for the middle-frequency and the high-frequency groups. By analyzing the device counts in such observation frequency ranges, the system can supplement the device count for low-frequency devices that may not be consistently observed. In one example, the system only adjusts the data for underrepresented sample frequencies in combination with the simple normalization factor.

Generally, normalizing the data facilitates determining the number of visitors at a POI and/or in a geographic region. In one version, the system calculates a number of ghost devices based on the normalization factor. The ghost devices represent devices of users that are present in a given area despite not being observed. The system then determines a number of visitor devices based on the number of ghost devices. For example, the number of visitor devices in a given area is determined by summing the ghost devices from a different home region, such as devices from a different home county. The system further applies a visitor dampening factor to identified visitor devices. The visitor dampening factor accounts for variations in the data caused by demographic behaviors, such as visitors using devices less often when in a visitor county than when in the home county. In one example, the visitor dampening factor is calculated by comparing the number of observations recorded in the home region for a device to the number of observations recorded outside the home region for that device. Further, the system removes duplicate device observations that are included in the visitor device count for more than one geographic area. For instance, the system removes duplicate visitor counts that may occur on the boundary between two counties, POIs, and/or other areas. Determining the number of visitor devices based on normalized device observations allows the visitor device counts to be more accurate than using raw data and/or other methods.

The system is further configured to distinguish between single day visitors and overnight visitors. In some cases, overnight visitors are flagged as single day visitors, such as due to low observation frequency. It is valuable to distinguish between single day and overnight visitors because single day visitors are much less likely to interact with POIs and/or other attractions in an area compared to overnight visitors. The system is configured to normalize the overnight visitor counts by determining an overnight visitor percentage. In one example, the overnight visitor percentage is based on an aggregated number of overnight visitors over a period of time, such as month and/or another length of time. In one version, the overnight visitor percentage is calculated using data from devices in a higher-frequency observation group. Low-frequency devices may be incorrectly classified as single day visitors more often than high-frequency devices. Using high-frequency device observations generally allows the overnight visitor percentage to be determined more accurately than using raw data and/or only low-frequency device data.

The systems and techniques as described and illustrated herein concern a number of unique and inventive aspects. Some, but by no means all, of these unique aspects are summarized below.

Aspect 1 generally concerns a method.

Aspect 2 generally concerns the method of any previous aspect including correcting location data to account for undercounted devices.

Aspect 3 generally concerns the method of any previous aspect including normalizing data based on dwell time of users.

Aspect 4 generally concerns the method of any previous aspect including determining a number of visitor devices in a geographic area.

Aspect 5 generally concerns the method of any previous aspect including calculating a probability of a device being observed at a point of interest (POI).

Aspect 6 generally concerns the method of any previous aspect in which the probability is determined for a given dwell time of devices at the POI.

Aspect 7 generally concerns the method of any previous aspect including calculating a normalization factor based on population data for a geographic area and the number of devices observed in the geographic area.

Aspect 8 generally concerns the method of any previous aspect including normalizing the device observation data based on the normalization factor and the probability.

Aspect 9 generally concerns the method of any previous aspect including separating user devices into groups based on frequency of observation.

Aspect 10 generally concerns the method of any previous aspect including determining a proportion of a total device count in each frequency group.

Aspect 11 generally concerns the method of any previous aspect including adding devices to the total device count based on the proportion of total devices in a frequency group and a number of devices observed in that frequency group.

Aspect 12 generally concerns the method of any previous aspect including calculating an expected number of user devices observed in each POI based on the probabilities.

Aspect 13 generally concerns the method of any previous aspect including calculating a normalization factor based on the expected number of devices and population data of the geographic area.

Aspect 14 generally concerns the method of any previous aspect including calculating a number of ghost devices based on the normalization factor.

Aspect 15 generally concerns the method of any previous aspect including determining a number of visitor devices based on the number of ghost devices.

Aspect 16 generally concerns the method of any previous aspect including applying a visitor dampening factor to identified visitor devices.

Aspect 17 generally concerns the method of any previous aspect including normalizing a number of overnight visitors using an overnight visitor percentage.

Aspect 18 generally concerns the method of any previous aspect including organizing devices into groups based on frequency of observation.

Aspect 19 generally concerns the method of any previous aspect including determining a probability fit function that varies with dwell time and observation frequency of the user devices.

Aspect 20 generally concerns the method of any previous aspect in which the probability fit function is an interpolation of multiple functions that vary with dwell time and observation frequency of the user devices.

Aspect 21 generally concerns the method of any previous aspect in which the probability is modeled based on the probability of each user device being observed at a particular hour in the day.

Aspect 22 generally concerns the method of any previous aspect including aggregating the probabilities of each device being seen in the POI.

Aspect 23 generally concerns the method of any previous aspect including comparing the proportion for a frequency group to the ratio between the device count in that frequency group and the total device count.

Aspect 24 generally concerns the method of any previous aspect including adding devices to the total device count if the ratio is greater than the proportion.

Aspect 25 generally concerns the method of any previous aspect in which the number of added devices is half the number of devices needed to make the ratio equivalent to the proportion.

Aspect 26 generally concerns the calculating an expected number of devices observed in each POI based on the probability of any previous aspect including calculating an average dwell time for devices in each POI.

Aspect 27 generally concerns the method of any previous aspect including comparing the number of observations for a device in a home county of the device to the number of observations outside the home county of the device.

Aspect 28 generally concerns the method of any previous aspect including removing duplicate device observations that are counted in the visitor volume in more than one geographic area.

Aspect 29 generally concerns the method of any previous aspect in which the overnight visitor percentage is based on an aggregated number of overnight visitors over a period of time.

Aspect 30 generally concerns the method of any previous aspect in which the overnight visitor percentage is calculated using devices from a higher observation frequency group.

Aspect 31 generally concerns a system.

Aspect 32 generally concerns the system of any previous aspect including a computer.

Aspect 33 generally concerns the system of any previous aspect in which the computer is configured to normalize data based on dwell time of users.

Aspect 34 generally concerns the system of any previous aspect in which the computer is configured to correct location data to account for undercounted devices.

Aspect 35 generally concerns the system of any previous aspect in which the computer is configured to determine a number of visitor devices in a location.

Aspect 36 generally concerns the system of any previous aspect in which the computer has a processor and memory operatively coupled to the processor.

Aspect 37 generally concerns the method of any previous aspect including receiving geospatial data of user devices.

Aspect 38 generally concerns the method of any previous aspect in which the geospatial data includes locations of the user devices recorded at one or more points in time.

Aspect 39 generally concerns the method of any previous aspect including correcting the geospatial data to account for undercounted user devices.

Aspect 40 generally concerns the method of any previous aspect including calculating probabilities of the user devices being observed at a point of interest (POI).

Aspect 41 generally concerns the method of any previous aspect in which the probability is determined based on a dwell time of the user devices at the POI.

Aspect 42 generally concerns the method of any previous aspect in which the dwell time represents an amount of time that the user devices are observed at the POI within the geospatial data.

Aspect 43 generally concerns the method of any previous aspect including calculating a normalization factor based on population data for a geographic area and the number of user devices observed in the geographic area.

Aspect 44 generally concerns the method of any previous aspect including determining a normalized device count at the POI based on the normalization factor and the probabilities.

Aspect 45 generally concerns the method of any previous aspect in which the normalized device count represents a realistic number of users physically present at the POI.

Aspect 46 generally concerns the method of any previous aspect including organizing the user devices into groups based on observation frequencies of the user devices.

Aspect 47 generally concerns the method of any previous aspect in which the observation frequency is based on a number of times the user device is observed in the geospatial data in a given period of time.

Aspect 48 generally concerns the method of any previous aspect including determining a dwell time for the user devices at a point of interest (POI).

Aspect 49 generally concerns the method of any previous aspect including calculating probabilities of the user devices being observed at the POI based on the dwell times and the observation frequencies.

Aspect 50 generally concerns the method of any previous aspect including determining a normalized device count at the POI based on the probabilities.

Aspect 51 generally concerns the method of any previous aspect including determining a number of visitor devices at the POI.

Aspect 52 generally concerns the method of any previous aspect including adjusting the normalized device count based on the number of visitor devices.

Aspect 53 generally concerns the method of any previous aspect including organizing the user devices into frequency bands based on the observation frequencies.

Aspect 54 generally concerns the method of any previous aspect including determining a proportion of a total device count in at least one of the frequency bands for the user devices in a geographic area that contains the POI.

Aspect 55 generally concerns the method of any previous aspect including calculating a ratio between the number of user devices in the frequency band and the normalized device count for the user devices at the POI.

Aspect 56 generally concerns the method of any previous aspect including comparing the proportion to the ratio.

Aspect 57 generally concerns the method of any previous aspect including increasing the normalized device count at the POI based on the difference between the ratio and the proportion.

Aspect 58 generally concerns the method of any previous aspect including calculating a corrective number of devices.

Aspect 59 generally concerns the method of any previous aspect in which the corrective number of devices is a number of user devices added to the normalized device count at the POI that causes the ratio to equal the proportion.

Aspect 60 generally concerns the method of any previous aspect in which the normalized device count at the POI is increased by an amount less than the corrective number of devices.

Aspect 61 generally concerns the method of any previous aspect in which the proportion is calculated for a combination of the user devices in a high frequency band and a middle frequency band.

Aspect 62 generally concerns the method of any previous aspect in which the ratio is calculated for the combination of the user devices in the high frequency band and the middle frequency band at the POI.

Aspect 63 generally concerns the method of any previous aspect in which the probability is determined for each user device in the geographic area.

Aspect 64 generally concerns the method of any previous aspect in which the normalized device count is calculated based on the normalization factor for the geographic area.

Aspect 65 generally concerns the method of any previous aspect in which the geographic area contains the POI.

Aspect 66 generally concerns the method of any previous aspect in which the probabilities are calculated using the probability fit function.

Aspect 67 generally concerns the method of any previous aspect in which the probability fit function is determined based on historic geospatial data of the user devices selected from multiple past dates.

Aspect 68 generally concerns the method of any previous aspect including organizing the user devices from the historic geospatial data into groups based on observation frequency.

Aspect 69 generally concerns the method of any previous aspect including determining dwell times for the user devices in the historic geospatial data.

Aspect 70 generally concerns the method of any previous aspect including fitting the probability fit function to the historic geospatial data based on the observation frequency groups and the dwell times.

Aspect 71 generally concerns the method of any previous aspect including determining a home region for each user device.

Aspect 72 generally concerns the method of any previous aspect including determining an average number of user devices observed from each home region.

Aspect 73 generally concerns the method of any previous aspect including determining an average number of user devices observed for each observation frequency group.

Aspect 74 generally concerns the method of any previous aspect in which the average number of user devices is determined for each home region of the user devices.

Aspect 75 generally concerns the method of any previous aspect including calculating an expected number of user devices to be observed in the given period of time.

Aspect 76 generally concerns the method of any previous aspect including weighting the normalization factor for each observation frequency group based on expected number of user devices.

Aspect 77 generally concerns the method of any previous aspect in which the probabilities are calculated based on the observation frequency groups of the user devices.

Aspect 78 generally concerns the method of any previous aspect in which the expected number of user devices is determined for each home region of the user devices.

Aspect 79 generally concerns the method of any previous aspect in which the normalization factor is weighted for each home region of the user devices.

Aspect 80 generally concerns the method of any previous aspect in which the number of ghost devices represents a number of user devices at the POI that are not observed in the geospatial data.

Aspect 81 generally concerns the method of any previous aspect including summing the number of ghost devices for each home region outside the geographic region that contains the POI.

Aspect 82 generally concerns the method of any previous aspect including determining the number of visitor devices at the POI based on the number of ghost devices.

Aspect 83 generally concerns the method of any previous aspect in which the number of ghost devices is calculated for each home region of the user devices.

Aspect 84 generally concerns the method of any previous aspect including determining a number of home observations for each user device that is observed in the home region of that user device.

Aspect 85 generally concerns the method of any previous aspect including determining a number of total observations for each user device.

Aspect 86 generally concerns the method of any previous aspect including comparing the number of home observations to the total number of observations for the user devices.

Aspect 87 generally concerns the method of any previous aspect including calculating a distribution factor for each observation frequency group.

Aspect 88 generally concerns the method of any previous aspect including adjusting the number of user devices in each observation frequency group based on the distribution factors.

Aspect 89 generally concerns the method of any previous aspect including calculating a visitor dampening factor based on a change in the number of total observations relative to the number of home observations for the user devices.

Aspect 90 generally concerns the method of any previous aspect in which the normalized device count is adjusted based on the visitor dampening factor.

Aspect 91 generally concerns the method of any previous aspect in which the geographic areas include geographic cells.

Aspect 92 generally concerns the method of any previous aspect in which the cell is a customized division.

Aspect 93 generally concerns the method of any previous aspect in which the cells have a consistent area and shape.

Aspect 94 generally concerns the method of any previous aspect in which the visitor dampening factor is determined based on observations in a home county and observations in visitor counties.

Aspect 95 generally concerns the method of any previous aspect in which the visitor dampening factor is determined based on observations in a home cell and observations in visitor cells.

Aspect 96 generally concerns the method of any previous aspect in which the geographic areas include census tracts.

Aspect 97 generally concerns the method of any previous aspect in which the geographic areas include areas designated in a census.

Aspect 98 generally concerns the method of any previous aspect including normalizing device counts based on observations in the census tracts and a census population for each census tract.

Aspect 99 generally concerns the method of any previous aspect including determining a regional visitor dampening factor for a region encompassing multiple geographic areas.

Aspect 100 generally concerns the method of any previous aspect in which the regional visitor dampening factor is calculated based on visitor dampening factors from the geographic areas in the region.

Aspect 101 generally concerns the method of any previous aspect including interpolating between normalizing the device counts for the user devices as residents and as visitors.

Aspect 102 generally concerns the method of any previous aspect in which the interpolating is based on distances of the observations from the home regions of the user devices.

Aspect 103 generally concerns the method of any previous aspect including optimizing parameters used for normalizing the data.

Aspect 104 generally concerns the method of any previous aspect in which the parameters are optimized based on verification data.

Aspect 105 generally concerns the method of any previous aspect in which the verification data includes information not contained in the geospatial data.

Aspect 106 generally concerns the method of any previous aspect in which the verification data includes information about person counts from a ticketed event.

Aspect 107 generally concerns the method of any previous aspect in which the parameters include weights on device counts for high-frequency devices and for low-frequency devices.

Aspect 108 generally concerns the method of any previous aspect in which the parameters include weights on the visitor dampening factor.

Further forms, objects, features, aspects, benefits, advantages, and embodiments of the present invention will become apparent from a detailed description and drawings provided herewith.

BRIEF DESCRIPTION OF THE DRAWINGS

FIG. 7 is a flowchart of a technique for adjusting a normalized device count.

DETAILED DESCRIPTION OF SELECTED EMBODIMENTS

Figure 1:
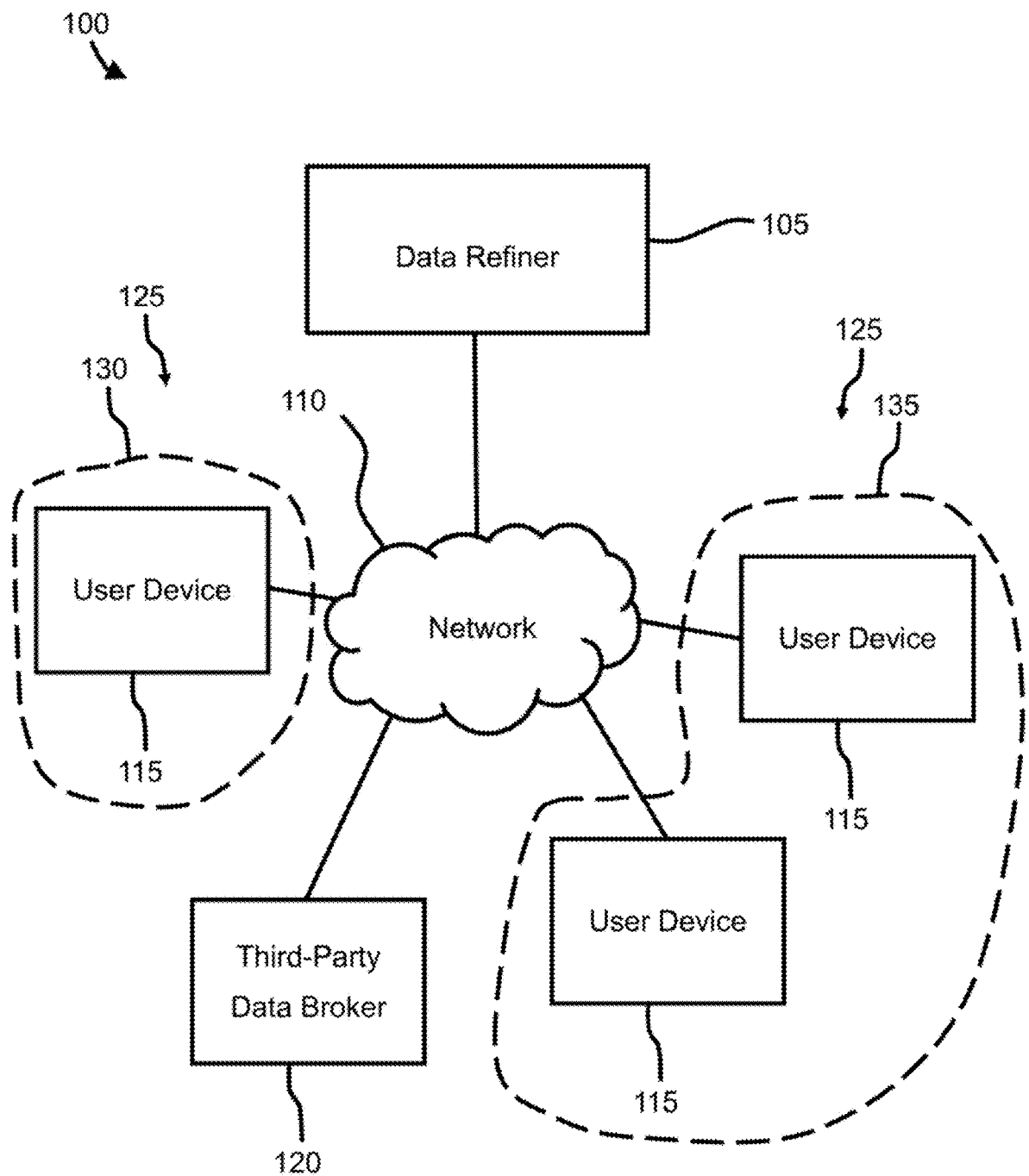
FIG. 1 is a block diagram of a system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Referring to FIG. 1, a system 100 is configured to normalize user counts derived from observation data about users. The observation data includes geospatial data about the users. The geospatial data generally includes recorded locations of users observed at various points in time. In many cases, the raw count does not fully represent the number of users at a particular location and time. In other words, the unprocessed number of users observed in the data does not always represent the actual number of users. Various factors can impact the accuracy of the raw counts compared to the actual counts. For example, local privacy laws may impact how frequently the user is observed at a location. Further, the observation frequency of a user may depend on various factors related to applications that record the location of a user. For instance, the type of application, the frequency of use, and/or permissions granted to the application can affect how a user is represented in the data. Trends in user behavior may also affect how often the users are observed. In many cases, the actual counts are higher than the observed counts because some users are not observed at a particular time. In some cases, the observed count at a location may overestimate the actual count. The system 100 normalizes user counts to compensate for users that are misrepresented in the observation data. Providing accurate information about user counts allows the user behavior to be analyzed reliably at different locations and times.

In one form, the system 100 generally includes a data refiner 105, a network 110, multiple user devices 115, and a third-party data broker 120. The data refiner 105 is generally configured to read and analyze data. Particularly, the data refiner 105 is configured to review observation data from the user devices 115 and correct various misrepresentations of the user devices 115 in the data. The observation data includes geospatial data about the user devices 115. The data refiner 105 normalizes the count of user devices 115 at various locations based on the geospatial data and the likelihood of observing the user devices 115. By normalizing the observation data, the data refiner 105 provides reliable data about user behavior. Among other examples, the data refiner 105 is configured to determine realistic numbers of people at a location, determine the number of visitors rather than locals at a location, and/or identify visitors that stay at a location overnight across multiple days. The data refiner 105 includes one or more computers. In one example, the data refiner 105 is a remote server and/or a network of computers. In an alternative example, the data refiner 105 is a personal computer or similar device. The data refiner 105 optionally includes software, such as an operating system. The operating system is adapted to perform various normalization calculations on the observation data.

The network 110 supports communication between the data refiner 105, the user device 115, and/or the third-party data broker 120. The network 110 generally utilizes the Internet, a cellular network, a mobile network, and/or another type of network. In one example, the data refiner 105 is connected to the third-party data broker 120 over one network 110, and a separate network 110 connects the third-party data broker 120 to the user devices 115. Using the network 110, the third-party data broker 120 is configured to receive geolocation data from the user devices 115, aggregate the data from the multiple user devices 115 over a period of time, and send the aggregated geospatial data to the data refiner 105. In an alternate example, the user devices 115 are configured to send location data directly to the data refiner 105 via the network 110.

The user device 115 is generally a personal device owned and/or carried by a user. The user device 115 can for example include a mobile phone, personal computer, navigational device, and/or other types of device. Typically, the user device 115 includes software, such as one or more applications, that record and/or report location data periodically. For instance, applications can record the location of the user device 115 when in use, when running in the background, at regular intervals, and/or in other ways. The user device 115 optionally sends such location data to a server, such as a server associated with a particular application on the user device 115. The user device 115 can utilize a variety of methods to determine the location of the user device 115. For instance, the user device 115 utilizes Global Positioning System (GPS), cell tower triangulation, Internet Protocol (IP) location tracking, and/or other techniques. The user device 115 records geolocation, temporal, and/or other types of data. In some cases, the geospatial data from the user device 115 includes multiple types of data.

The third-party data broker 120 is typically configured to receive geospatial data from multiple user devices 115 directly over the network 110 and/or from an intermediate data collector. For example, the third-party data broker 120 can receive geospatial data from one or more intermediate sources, such as internet providers, cell service providers, mobile device application servers, and/or other sources. The third-party data broker 120 generally includes one or more computers, such as a remote server and/or a database. The third-party data broker 120 is configured to provide observation data from the user devices 115 to the data refiner 105. In some cases, the third-party data broker 120 processes the data to some degree before sending to the data refiner 105. For instance, as a part of aggregating the data from multiple sources, the third-party data broker 120 modifies the observation data by rounding locations in the data, rounding times in the data, filtering the data, and/or tagging the data as examples. Although not certain, these and similar actions by the third-party data broker 120 may introduce anomalies into the data. Alternatively or additionally, processing by the third-party data broker 120 may exacerbate factors that impact the accuracy of the observation data relative to the true time and location of the user devices 115.

In one version, each user device 115 is placed into a device observation group (DOG) 125. Each DOG 125 represents a different observation frequency for the user devices 115. For example, the DOGs 125 represent ranges for the number of times each user device 115 is observed. Typically, each user device 115 is assigned to the corresponding DOG 125 based on the number of times the user device 115 is observed in a given day. The user devices 115 that are observed few times in a day are placed in a low-frequency group 130. The user devices 115 that are observed many times in a day are placed in a high-frequency group 135. The system 100 can arrange the devices into any number of DOGs 125. In one example, the user devices 115 are arranged into 10 DOGs 125. The observation frequency of the user devices 115 is related to how accurately the observation data represents the true behavior of the user devices 115. Because the user devices 115 in the high-frequency group 135 have more points of observation, the data generally reflects reliable locations of those user devices 115 at any given time. Conversely, observation data may be inaccurate for the user devices 115 in the low-frequency group 130 because those user devices 115 are rarely observed. Organizing the user devices 115 based on observation frequency aids the system 100 to account for the user devices 115 that are underrepresented in the data. For example, as a part of normalizing the data, the system 100 uses the DOGs 125 to determine a probability of observation for each user device 115. Further, normalizing the observation data based on the DOGs 125 allows the system 100 to account for different effects on the device counts that vary with observation frequency.

Figure 2:
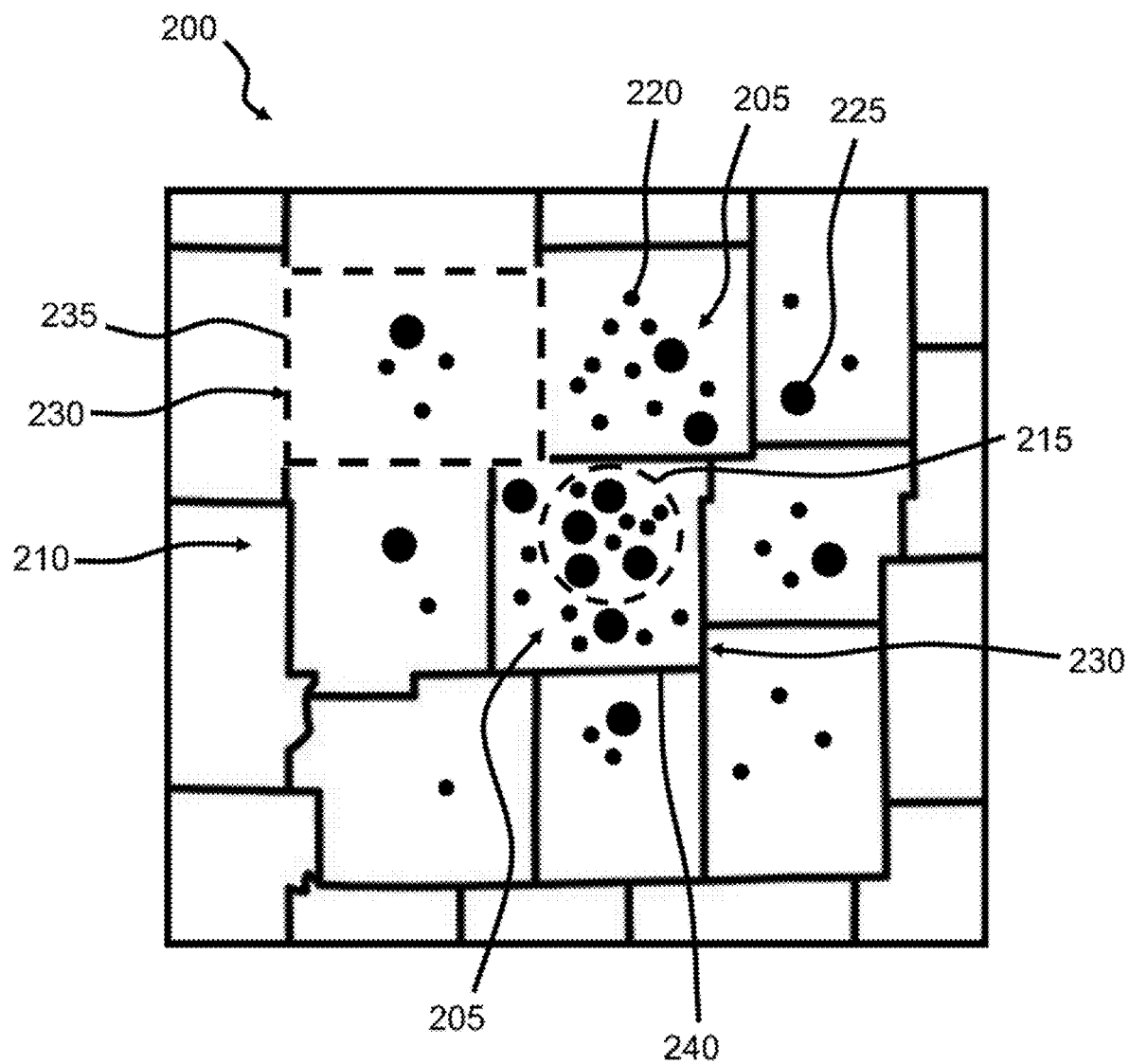
FIG. 2 is a diagram of a map representing data utilized by the FIG. 1 system.

As shown in FIG. 2, the observation data can be represented in the form of a map 200. The data includes multiple observations 205. The observations 205 on the map 200 represent the locations at which the user devices 115 are observed. Each observation 205 includes the location and time that the user device 115 is observed. In one example, an app on the user device 115 automatically records observations 205 periodically. In another example, the app only records an observation 205 when the user opens or actively interacts with the app. In yet another example, the user device 115 records an observation 205 when pinged by a server, such as the third-party data broker 120 and/or another device. The observations 205 further include information about the user device 115, such as a home location, the type of device, demographic information, and/or other types of information. Alternatively or additionally, the observations 205 include an anonymous device identifier for the user device 115. The anonymous identifier allows the system 100 to observe the user device 115 across multiple observations 205 but is not tied to any personal information about the users.

The observation data is typically analyzed based on a geographic region 210 and/or at a point of interest (POI) 215. The geographic regions 210 are regions with defined boundaries, such as zip codes, census tracts, cities, and/or states as examples. In the FIG. 2 example, the geographic regions 210 include counties 230. In another example, the geographic regions 210 include other divisions used as census designations, such as census blocks, block groups, and/or other sizes of census tracts. In yet another example, the geographic regions 210 include customized divisions, such as tileable cells having a consistent shape and/or size. For instance, the geographic regions 210 include cells that are on a similar geographic scale to the counties 230 and/or another geographic division. In one example, the observation data is arranged by geographic region 210 before the data refiner 105 receives the data. In another example, the data refiner 105 organizes the observation data into the geographic regions 210. The POI 215 is generally a smaller area than the geographic region 210, such as a specific landmark, building, park, neighborhood, event space, and/or other area within the geographic region 210. The POIs 215 are typically locations where various entities want to track the number of people and/or the behavior of people. For example, local municipalities, event organizers, city planners, and/or other entities may be interested in the population at a particular POI 215 at particular points in time. Normalizing the observation data at the POIs 215 allows such entities to have access to accurate counts of the user devices 115 and/or total number of people at the POIs 215.

In the FIG. 2 example, the user devices 115 are represented by dots at the location of the observations 205 for that user device 115. In the map 200, the observations 205 for each user device 115 are shown at a consistent location. The locations of the user devices 115 are constant across multiple observations 205 for the sake of illustration. In practice, the user devices 115 typically move around and a given user device 115 may have observations 205 at multiple different locations over time. The user devices 115 with a low number of observations in a given time frame are denoted as low-frequency devices 220. For example, the low-frequency devices 220 are the user devices 115 in the low-frequency group 130. The user devices 115 with a high number of observations 205 in a given time frame are denoted as high-frequency devices 225. For example, the high-frequency devices 225 are the user devices 115 in the high-frequency group 135. The data refiner 105 is further configured to denote the user devices 115 in additional DOGs 125 based on the number of observations 205. In the illustrated example, the low-frequency devices 220 are represented with smaller dots and the high-frequency devices 225 are represented with larger dots. The size of the dot generally represents the number of observations 205 from a particular user device 115. As noted, the low-frequency devices 220 are oftentimes underrepresented by the observations 205 such that the data does not include accurate locations for the low-frequency devices 220 at many times of the day. As a result, the number of low-frequency devices 220 observed at a given time is typically less than the actual number of user devices 115. The system 100 is configured to determine a normalized device count that more accurately represents the number of user devices 115

As noted, the geographic regions 210 include counties 230. Dividing the data based on county 230 and/or other sizes of census areas (i.e., census tracts, census blocks, block groups) allows the system 100 to utilize dependable information to normalize the data, such as official boundaries and/or government census populations as examples. As should be appreciated, the system 100 is configured to use data divided into any size and/or types of geographic regions 210. For the purpose of explanation, the geographic regions 210 are generally described in the form of the counties 230. Relative to each user device 115, a given county 230 can be a home county 235 or a visitor county 240 at a given time. The home county 235 typically refers to the county 230 in which a particular user resides. In one example, the system 100 determines a common evening location (CEL) for each user device 115. The CEL refers to a location, such as the POI 215 and/or the county 230, where the user device 115 is repeatedly observed in the evening or overnight. The CEL represents a home location of the user device 115 and the user. The home county 235 for a given user device 115 is the county 230 that contains the CEL for that user device 115. On the other hand, the visitor counties 240 are the counties 230 outside of the home county 235 for a given user device 115. When the user device 115 is observed in the visitor county 240, that user is generally considered a visitor because the user is outside of the home county 235. In many cases, the behavior of the user devices 115 is different when the user device 115 is in the home county 235 compared to in the visitor county 240. The system 100 is configured to distinguish whether a given user device 115 is in the home county 235 or in the visitor county 240 at a particular time. During normalization, this allows the system 100 to account for changes in observation frequency that occur when the user devices 115 are observed as a visitor rather than as a resident. Further, the system 100 is configured to determine the number of visitors at a given POI 215. Knowing the number of user devices 115 that are visitors at a given POI 215 can provide valuable insight to event organizers, municipalities, and/or other groups.

Figure 3:
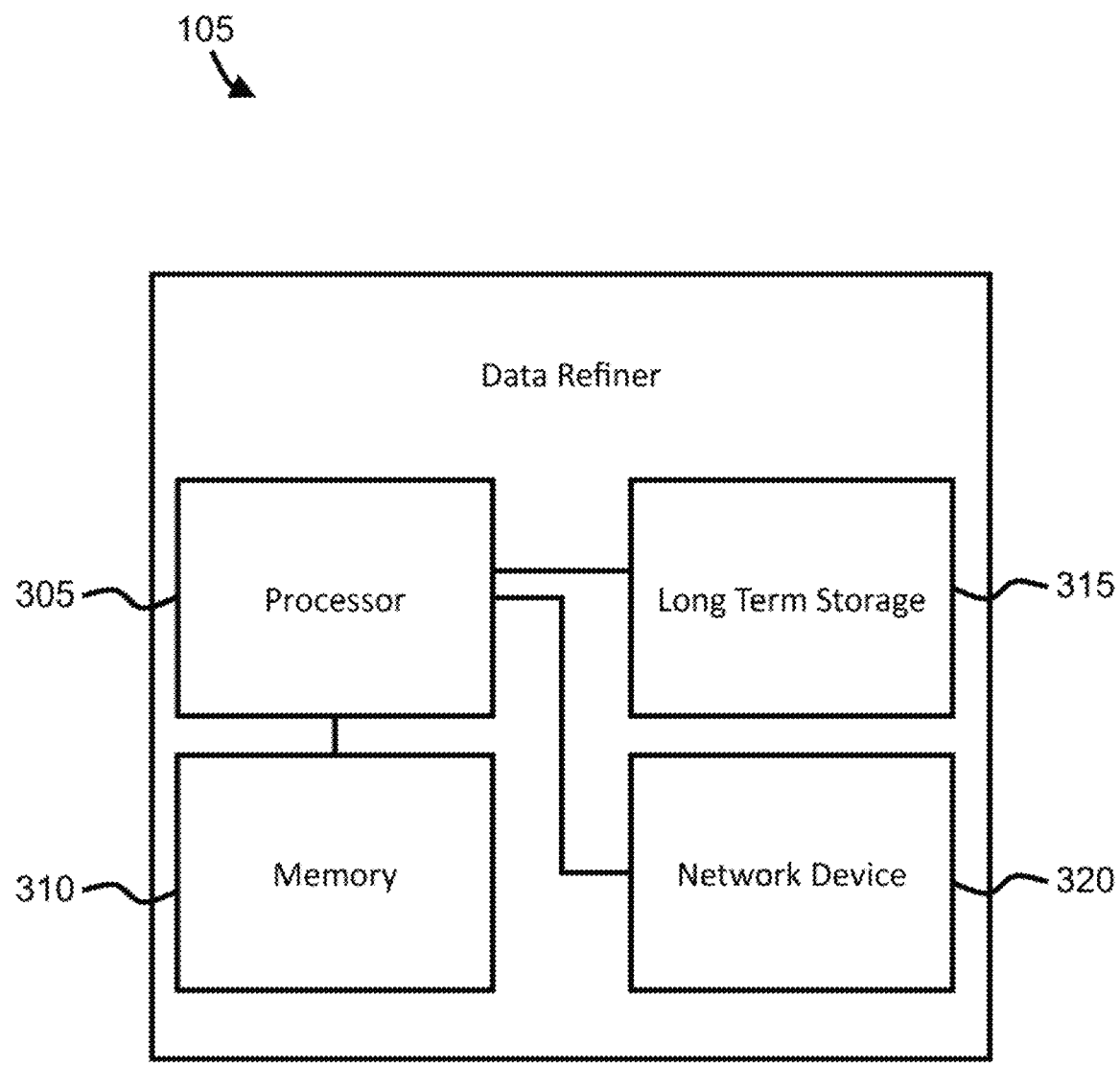
FIG. 3 is a block diagram of a data refiner from the FIG. 1 system.

FIG. 3 illustrates the data refiner 105 according to one example. The data refiner 105 generally includes at least one processor 305, memory 310, long-term storage device 315, and networking device 320. The processor 305 is generally connected to and configured to communicate with the memory 310, the long-term storage device 315, and the networking device 320. In one version, the data refiner 105 includes multiple processors 305, memories 310, long-term storage devices 315, and/or networking devices 320 that are split across multiple devices, such as across multiple computers in a computing cluster and/or network of computers.

The processor 305 is configured to perform calculations and/or other computational tasks. For example, the processor 305 performs algorithms for normalizing the observation data, for calculating a probability, for organizing the user devices 115 into DOGs 125, and/or for other tasks. In one example, the processor 305 runs an operating system that performs one or more such tasks. The memory 310 is configured to store data, algorithms, and/or other information. For example, the memory 310 stores one or more normalization and/or probability algorithms. In another example, the memory 310 stores observation data before, during, and/or after the processor 305 normalizes the data. The long-term storage device 315 similarly is configured to store data, algorithms, and/or other information. The long-term storage device 315 typically has a larger capacity than the memory 310, while the memory 310 is typically configured to communicate data more quickly to the processor 305 compared to the long-term storage device 315. In one example, the long-term storage device 315 stores large amounts of data, such as observation data for many user devices 115 recorded across multiple days or months. The memory 310 then stores a subset of the observation data being processed by the processor 305, such as the observations 205 for a single geographic region 210 and/or from a single day.

The networking device 320 is configured to provide an interface between the data refiner 105 and the network 110 and/or another network. The networking device 320 generally allows the data refiner 105 to send and/or receive data, commands, and/or other information across the network 110. For instance, the data refiner 105 receives data from the user devices 115 and/or the third-party data broker 120 using the networking device 320. The networking device 320 supports wired and/or wireless connections. In one version, the data refiner 105 further includes one or more input/output (I/O) devices. The I/O devices generally allow a user to adjust the performance of the data refiner 105, such as by changing the time frame of various normalization processes (e.g., daily, monthly, etc.), changing the geographic frame of such normalization processes (e.g., by county 230, by POI 215, etc.), and/or adjusting other parameters. In another example, a user can adjust the data refiner 105 in such ways by sending commands to the data refiner 105 via the network 110.

Referring to FIGS. 4-12, the system 100 is configured to perform a method or technique for normalizing the observation data. The technique generally involves normalizing the number of user devices 115 at a particular location and/or time. For example, the system 100 normalizes the number of user devices 115 at a given POI 215, within a given county 230, on a given day, over a given month, and/or for another combination of location and time frame. One or more parts of the system 100 perform various parts of the method. For example, the data refiner 105 is configured to perform one or more parts of the method. Further, different parts of the data refiner 105 may perform one or more parts of the method. For instance, the processor 305, the memory 310, the long-term storage device 315, and/or the networking device 320 in the data refiner 105 perform one or more parts of the method. Further, the data refiner 105 includes software that stores and/or executes part of the method, such as via an operating system and/or programmed algorithms as examples. In one example, the data refiner 105 performs the method using a series of database tables for storing and performing calculations on the observation data. For convenience, the technique is generally described as being performed by the data refiner 105. As should be appreciated, various parts of the system 100 are configured to perform one or more parts of the technique.

Figure 4:
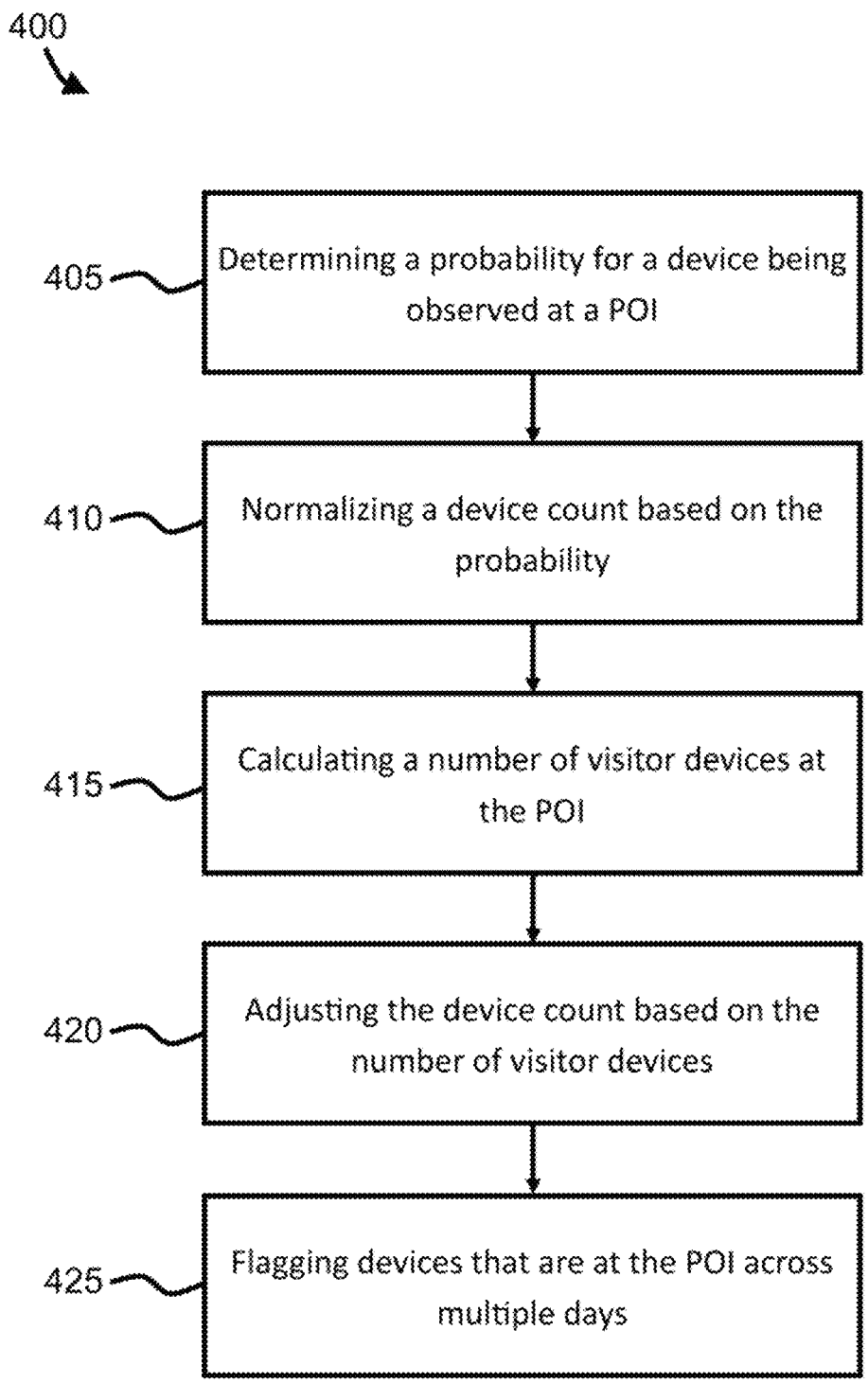
FIG. 4 is a flowchart of a technique for normalizing device observation data.

FIG. 4 depicts a flowchart 400 illustrating a technique for normalizing observation data. The technique involves normalizing the data in various ways. The data refiner 105 utilizes any combination of normalization techniques from the flowchart 400 to normalize the observation data. The flowchart 400 is generally described as being performed on a daily basis and/or using data for a single day. As should be appreciated, the data refiner 105 is configured to perform the technique using data for a day, week, month, year, or another time frame. Further, the flowchart 400 is described as determining the number of user devices 115 at a given POI 215 based on the home county 235 of the user devices 115. As should be appreciated, the data refiner 105 is configured to determine device counts at any POI 215, county 230, and/or other geographic region 210.

At stage 405, the data refiner 105 determines a probability of a given user device 115 being observed at a given POI 215. The probability represents the chance that the user device 115 is observed at the POI 215 given that the user device 115 is actually present at the POI 215. The probability is further determined for a given dwell time of the user device 115 at the POI 215. The data refiner 105 typically calculates this probability for each user device 115 and/or for each POI 215 in a given geographic region 210. In one example, the data refiner 105 organizes the user devices 115 into the DOGs 125 as a part of the probability calculation. The probability calculation generally changes based on the DOG 125 of the user device 115 (i.e., the observation frequency of the user device 115). The data refiner 105 utilizes a probability function that is designed to fit historic observation data. The probability function typically varies with dwell time and observation frequency of the user device 115 at the POI 215. In one version, the probability function is an interpolation of multiple functions, such as three different probability functions for example. In another version, the probability function is based on a probability of the device being observed at the POI 215 during a given hour in the day. For instance, the data refiner 105 utilizes a cubic interpolation of the probabilities that vary with dwell time across the day.

At stage 410, the data refiner 105 normalizes a device count based on the probabilities of the user devices 115. The device count generally refers to the number of user devices 115 at a particular POI 215, in a particular county 230, and/or at another location. In the simplest form, the device count is determined as the number of unique user devices 115 represented in the observations 205 at the POI 215. Again, the observations 205 do not perfectly represent the actual number of users at the POI 215. The data refiner 105 generally normalizes the device count to be a more accurate representation of the user devices 115 that are present at the POI 215. In one version, the normalized device count generally represents the number of people at the POI 215 regardless of the amount of people having user devices 115. In another version, the normalized device count represents the number of user devices 115 regardless of the total number of people. In some cases, the number of people and the number of user devices 115 are equivalent or almost equivalent. Because the probability from stage 405 shows the likelihood that the user device 115 physically at the POI 215 is observed, the data refiner 105 uses the probability to increase the device count for user devices 115 that are more likely to go unobserved.

In one version, the normalization process at stage 410 utilizes a normalization factor that the data refiner 105 determines for each county 230. The normalization factor is based on population data that is relatively constant over short periods. In another version, the data refiner 105 determines a weighted normalization multiplier. The weighted multiplier is weighted based on observation frequency of the user devices 115. Weighting the normalization multiplier in this way allows the data refiner 105 to naturally account for factors that affect different DOGs 125 differently. The weighted normalization multiplier allows the data refiner 105 to more accurately normalize the device counts from each DOG 125. For example, the data refiner 105 increases the device count in the low-frequency group 130 to account for user devices 115 that might go unobserved but does not over inflate the device count in the high-frequency group 135.

The data refiner 105 is further configured to determine a visitor volume at the POI 215. At stage 415, the data refiner 105 calculates the number of user devices 115 that are visitors at the POI 215. The data refiner 105 generally determines the number of user devices 115 that are present but unobserved at the POI 215. The data refiner 105 determines this number based on the CEL of the user devices 115, such as by the home county 235 of user device 115. The data refiner 105 then computes the visitor count by summing this number for each home county 235 that is outside the county 230 containing the POI 215. Normalizing the device counts generally facilitates calculating the visitor count at the POI 215 in this technique. Knowing an accurate visitor count at a particular POI 215 can be valuable for event organizers, city planners, and/or other entities.

At stage 420, the data refiner 105 adjusts the device count based on the number of visitors. It has been observed that user devices 115 are less frequently observed in visitor counties 240 than when in the home county 235. It is speculated that various factors, such as trends in different demographics and/or differences in privacy permissions, may cause this effect. The data refiner 105 calculates a visitor damping factor based on the decrease in observation frequency for visitors. For example, the visitor damping factor is based on comparisons between the observations 205 in the home county 235 and the observations 205 outside the home county 235 for each user device 115. In other words, the data refiner 105 accounts for differences in observation frequency when the user device 115 is observed as a visitor compared to being observed as a resident. In one version, the visitor damping factor is calculated based on geographic cells having similar sizes to the counties 230. For instance, the data refiner 105 is configured to compare the observations 205 from inside a home cell and from outside that home cell. The data refiner 105 applies the visitor damping factor at one or more stages in the normalization technique. For instance, the damping factor is used when determining the DOGs 125 for each user device 115.

In one version, the stage 425 further flags the user devices 115 based on overnight or single day visitor status. The data refiner 105 distinguishes between the user devices 115 that are only temporarily traveling through a given POI 215 and the user devices 115 that stay at the POI 215 overnight and across multiple days. It is valuable to distinguish between single day and overnight visitors because overnight visitors typically interact with the POI 215 and/or other attractions nearby significantly more than single day visitors. The data refiner 105 is configured to normalize an overnight visitor count for each POI 215 by determining an overnight visitor percentage. In one example, the data refiner 105 calculates the overnight visitor percentage based on observations 205 from the high-frequency devices 225. Because the high-frequency devices 225 are observed more frequently than the other user devices 115, the high-frequency devices 225 are typically more accurately represented by the observations 205. In some cases, overnight visitors are more likely than single day visitors to be mischaracterized or overrepresented by the observations 205. Normalizing the overnight visitor counts based on the high-frequency devices 225 can ensure that the data refiner 105 accurately accounts for overnight visitors across all the DOGs 125.

At one or more points during normalization, the data refiner 105 is configured to optimize various parameters. For example, such parameters include weights on the device count for the low-frequency devices 220, the device count for the high-frequency devices 225, the visitor damping factor, and/or the overnight visitor percentage among other variables. Using different weights and/or adjusting other parameters allows the data refiner 105 to tune the accuracy of the normalization process. In one version, the data refiner 105 uses additional verification data from other sources beyond the observation data. The verification data generally includes information about person counts that is tied to a particular time and/or location. For instance, the data refiner 105 uses data from ticketed events and/or cardholder spending data in an area as some examples. The verification data allows the data refiner 105 to compare the observation data to other sets of data that are generally reliable. The data refiner 105 is configured to adjust the weights and other parameters based on the verification data. Using the verification data in this way provides additional measures to ensure that the data refiner 105 normalizes the data reliably. In one example, the data refiner 105 is configured to optimize parameters for a specific event, such as by using verification data associated with that particular event and/or similar events.

Figure 5:
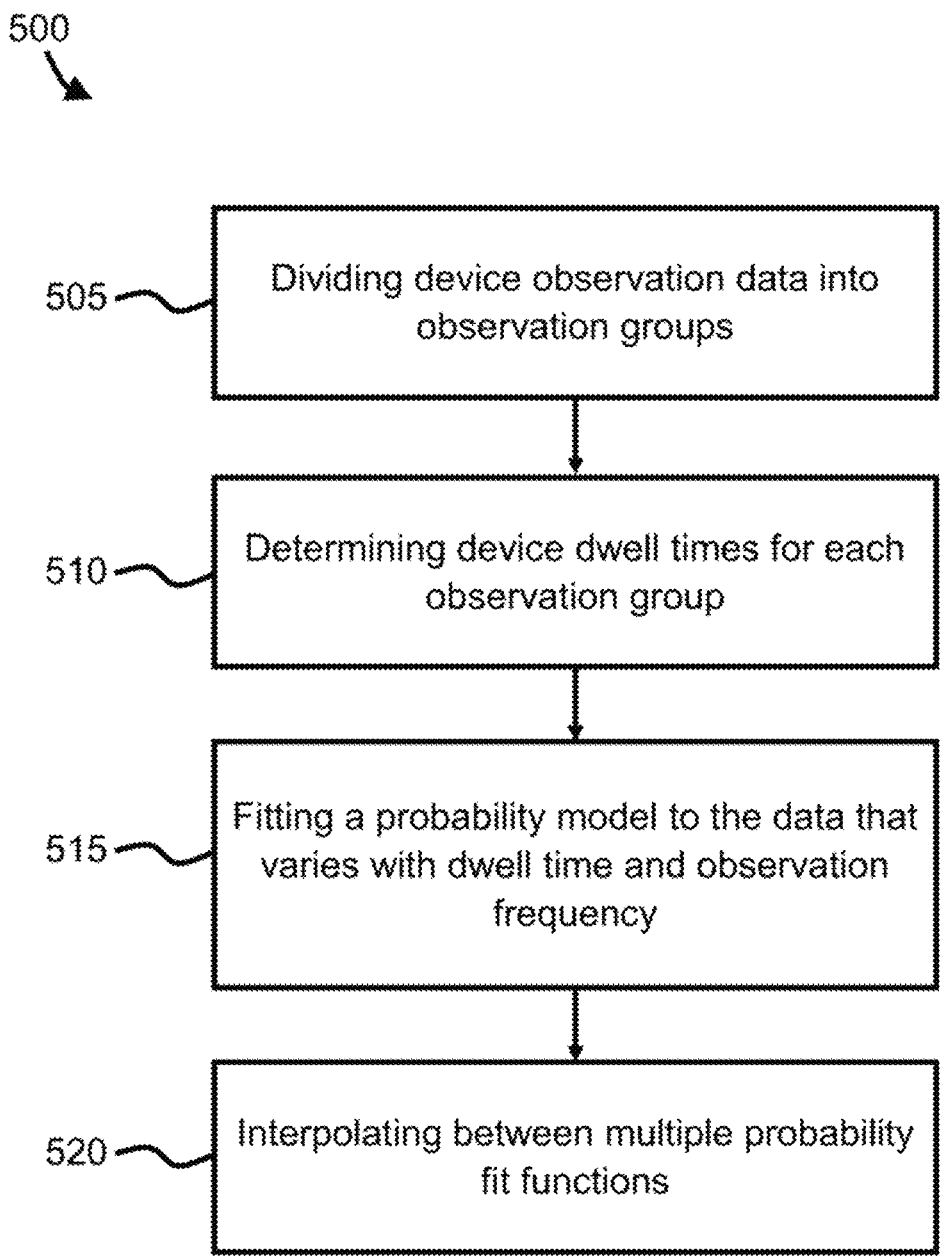
FIG. 5 is a flowchart of a technique for analyzing the probability of a device being observed.

FIG. 5 depicts a flowchart 500 illustrating a method for analyzing the probability of a user device 115 being observed at a particular POI 215. The technique illustrated by the flowchart 500 generally involves creating a probability model for the user devices 115. The probability model is used to determine the probability that a given user device 115 will be observed at a particular point of interest 215. The probability model is generally designed to vary with the DOG 125 of the user device 115 and the dwell time of the user device 115. When the data refiner 105 performs the probability calculation at stage 405 in FIG. 4, typically the data refiner 105 utilizes the probability model developed via the technique of FIG. 5. Generally, the data refiner 105 is configured to model the probability of being observed in a single day. For example, the data refiner 105 considers probability based on the total amount of daily observations 205 for the user device 115 and/or the hour of the day that the user device 115 is observed. Alternatively, the data refiner 105 is configured to model the probability on the scale of a week, month, and/or another period of time.

At stage 505, the data refiner 105 organizes the observation data into multiple DOGs 125. Again, the DOGs 125 represent different observation frequencies of the user devices 115 on a given day. The observation frequency generally corresponds to the number of observations 205 recorded for each user device 115 throughout the day. Typically, the data refiner 105 uses a selection of past observation data to establish the ranges of the DOGs 125 in the probability model. In one version, the data refiner 105 establishes the range of each DOG 125 based on data from a random selection of days, such as days randomly picked from a previous month or year. For instance, the data refiner 105 can select 10 random weekdays and 5 random weekend days within past data to define the DOGs 125. In another example, the data refiner 105 establishes the DOGs 125 based on a longer period, such as from data aggregated over a month or another period. The data refiner 105 then organizes the user devices 115 from this past observation data into the DOGs 125. In one example, the data refiner 105 arranges the user devices 115 into ten DOGs 125. The observation counts for the DOGs 125 can vary significantly. For instance, one or more low-frequency groups 130 typically have device counts in the single digits while one or more high-frequency groups 135 have observation counts in the hundreds. Intuitively, there is a lower chance of observing a user device 115 from the low-frequency group 130 than a user device 115 from the high-frequency group 135. By organizing the data based on observation frequency, the data refiner 105 is configured to more accurately model the observation probability for various user devices 115.

At stage 510, the data refiner 105 then determines dwell times for the user devices 115 in each DOG 125. The dwell time generally refers to the amount of time during a day that the user device 115 is observed. In one version, the dwell time is an average dwell time for all the user devices 115 in the given DOG 125 at the POI 215. In other words, the data refiner 105 determines how long an average user stays at the POI 215 for each DOG 125. In one example, the dwell time is based on the total amount of observation time for the user device 115 throughout the day. In another example, the dwell time is based on a continuous amount of time that the user devices 115 are observed. The data refiner 105 considers dwell times of the user devices 115 to the nearest hour, half hour, quarter hour, minute, or another resolution.

At stage 515, the data refiner 105 fits a probability model to the observation data based on the dwell times and the DOGs 125. The probability model generally predicts the chance that a user device 115 will be observed at a particular POI 215. In one version, the data refiner 105 fits a function to the probability that changes based on observation frequency and dwell time. The function utilizes a combination of logarithmic and exponential functions. The function is used for the user devices 115 in each DOG 125 across the entire day. In another version, the data refiner 105 determines multiple fit functions. The multiple fit functions typically have a similar form as the single fit function but with different fit parameters. The data refiner 105 uses different fit functions for the user devices 115 in different POIs 215 and/or for different dwell times. In yet another version, the data refiner 105 models the probability using a discrete slot model. The discrete slots represent discrete periods of time that the user devices 115 can be observed throughout the day. The discrete slots are analogous to a game having a discrete number of slots for balls to fill. The data refiner 105 generally determines the probability based on the ratio of the number of user devices 115 observed in a given time frame (i.e., number of slots) to the number of user devices 115 observed across the entire day. In one example, the slots each represent one hour. In another version, the slots represent a smaller amount of time, such as 15 minutes. The data refiner 105 uses a cubic interpolation across the probabilities for each slot throughout the day with respect to dwell time and observation frequency. The discrete slot approach is more complicated than using one or more functions with a set form. For instance, the discrete slot approach utilizes linear, quadratic, and/or other equation forms depending on the dwell time slots in which the user device 115 is observed. Using this approach can avoid issues related to particular times of the day, such as increased probabilities during common commute times.

In one version, the data refiner 105 continues to stage 520. At stage 520, the data refiner 105 interpolates between multiple probability fit functions. In one example, the data refiner 105 interpolates between the functions depending on the observation frequency (i.e., the DOG 125). The data refiner 105 completely shifts between different functions and/or utilizes a combination of multiple functions at different observation frequencies. The interpolation allows the data refiner 105 to more accurately model the probability for each combination of dwell time and observation frequency compared to using a single function for the whole set of data.

When calculating the probability at stage 405 in FIG. 4, The data refiner 105 typically applies the probability model determined using the technique of FIG. 5. When applying the probability model at stage 405 in FIG. 4, the data refiner 105 utilizes one or more parts of the flowchart 500. Typically, the data refiner 105 organizes the user devices 115 into multiple DOGs 125 based on observation frequency for a given set of observation data. For example, the data refiner 105 can utilize the same DOGs 125 that are used at stage 505. Typically, the data refiner 105 divides the user devices 115 into the DOGs 125 on each day being analyzed. The DOG 125 for a user device 115 can change from day to day. Further, the data refiner 105 determines the dwell times for the user devices 115 in the given set of observation data. For example, the data refiner 105 can perform the same actions as at stage 510. After analyzing the data to determine the observation frequencies and dwell times for the user devices 115, the data refiner 105 then calculates the probabilities that the user devices 115 were observed. The data refiner 105 utilizes the probability model from stage 515 and/or stage 520 to calculate a probability based on the observation frequency and dwell time.

Figure 6:
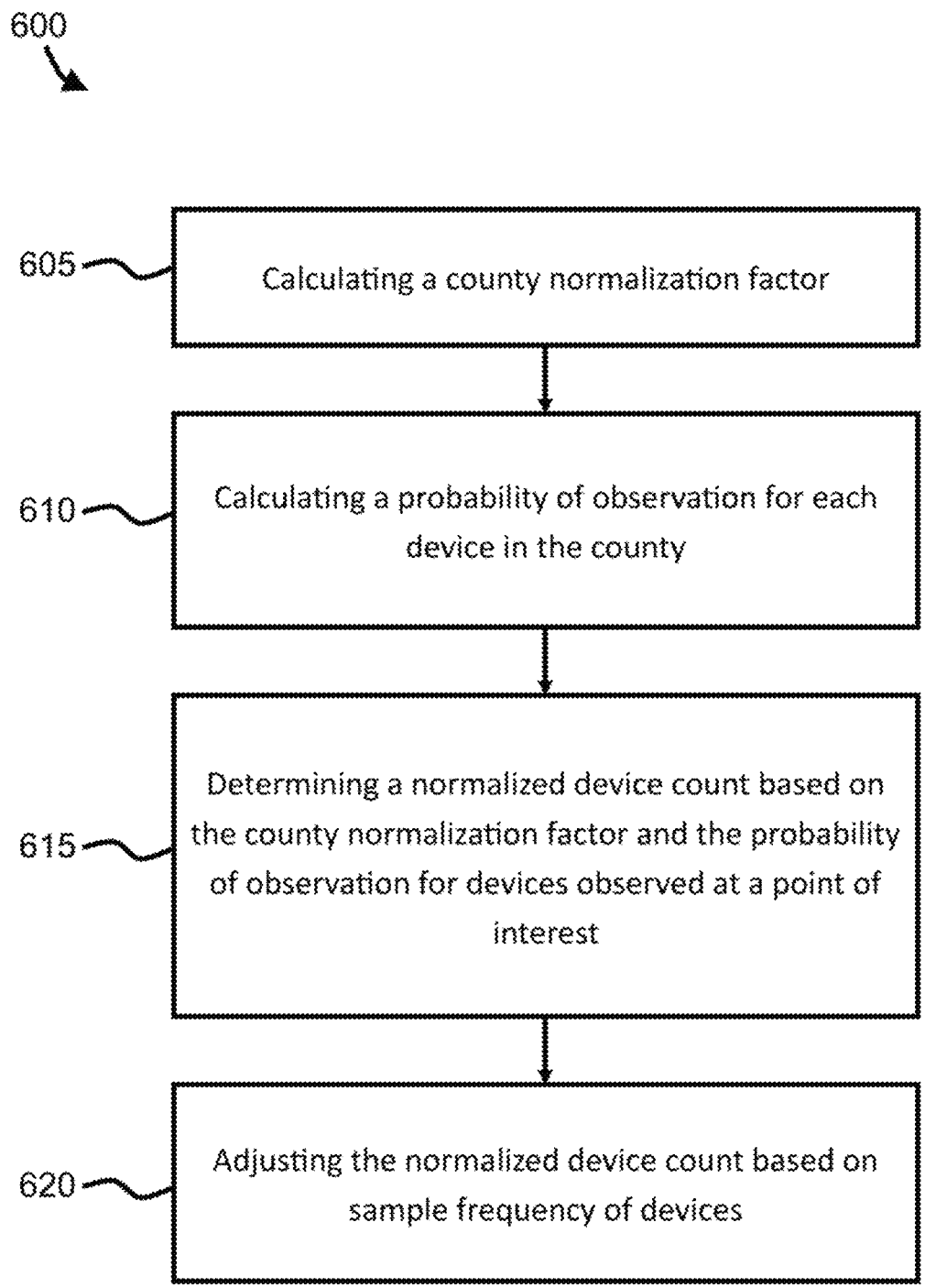
FIG. 6 is a flowchart of a technique for normalizing a device count.

Referring to FIG. 6, a flowchart 600 illustrates a technique for normalizing device counts. This technique is applicable to many sets of observation data and is agnostic to different causes of variation in the observations 205. The technique shown in the flowchart 600 generally involves a simplified way to normalize the data. Compared to other normalization techniques used by the data refiner 105, the technique illustrated in FIG. 6 may require fewer computing resources and/or may be performed faster. For instance, the other normalization techniques may be more complex and/or involve more computation steps than this technique. The flowchart 600 is described in the context of normalizing data based on the counties 230. As should be appreciated, the data refiner 105 is configured to normalize the data based on different types of geographic regions 210, such using state, city, zip code, neighborhood, and/or other region-specific data. Further, the flowchart 600 is described as being performed for device counts in a given day. The data refiner 105 is configured to normalize the device counts on the scale of a day, week, month, or another length of time.

At stage 605, the data refiner 105 calculates a county normalization factor. The county normalization factor is calculated using population data for a given county 230. For example, the county normalization factor is based on census data for the county 230 and/or long-term data collected for the county 230. The data refiner 105 determines the county normalization factor for each county 230 by comparing the daily device count in the county 230 to the population of that county 230. The normalization factor helps to scale the device counts in the county 230 toward the population of the county 230. Such a normalization factor generally accounts for various effects on the number of observations 205 recorded in the county 230 without targeting specific causes. As noted, the availability and frequency of observation data for the user devices 115 is thought to change based on local data privacy laws, local population habits, and/or other factors specific to a given county 230. Determining the normalization factor for each county 230 using population data for the county 230 allows the data refiner 105 to mitigate these and other unknown factors. Further, using the census population is particularly reliable for normalizing the observation data because the census population is not determined using observations 205. Therefore, the census population data is likely unaffected by the factors that influence device counts in each county 230.

At stage 610, the data refiner 105 calculates a probability of being observed for each user device 115. The data refiner 105 typically evaluates the probability for each user device 115 observed at a given point of interest 215 in the county 230. The probability is the chance that the user device 115 will be observed at the point of interest 215 given that the user visited the point of interest 215. In one example, when the data refiner 105 calculates the probabilities, the data refiner 105 utilizes a probability model developed using the technique in FIG. 5. Further, the data refiner 105 utilizes one or more parts of the flowchart 500 to calculate probabilities for the set of observation data being analyzed. Typically, the data refiner 105 organizes the user devices 115 into multiple DOGs 125 based on observation frequency. The data refiner 105 then determines the dwell times for the user devices 115 in the given set of observation data. For example, the data refiner 105 can perform similar actions as used at stage 505 and/or at stage 510 in FIG. 5. The data refiner 105 then calculates the probabilities of observation for the user devices 115 based on the observation frequency and dwell times. The data refiner 105 utilizes a single probability fit function, an interpolation of multiple probability fit functions, and/or another probability model to calculate the probabilities.

At stage 615, the data refiner 105 determines a normalized device count for the county 230 and/or for a given POI 215 in the county 230. The data refiner 105 aggregates the probabilities of each user device 115 being observed in the POI 215 for all the user devices 115 in the POI 215. While aggregating the probabilities, the data refiner 105 scales the count by the county normalization factor. In other words, the data refiner 105 adjusts the contribution to the total device count from each user device 115 based on the normalization factor and the observation probability. In one example, the data refiner 105 sums the ratio of the county normalization factor to the observation probability for the user device 115 across all the user devices 115 in the POI 215. By normalizing the data this way, the data refiner 105 counterbalances variations in the data that are caused by certain user devices 115 going unobserved at the POI 215, for example because of low dwell time and/or low observation frequency.

After normalizing the device count, the data refiner 105 adjusts the normalized device counts at stage 620 based on the distribution of the user devices 115 in the DOGs 125. The normalization calculation in stage 615 does not necessarily account for the proportions of the user devices 115 at each sample frequency that are expected in the county 230 and/or at the POI 215. For example, if most of the user devices 115 observed at the POI 215 are high-frequency devices 225, then it is possible that there are many low-frequency devices 220 at the POI 215 that were not observed. As another example, the number of low-frequency devices 220 at the POIs 215 may be inflated if there are anomalies in the data, such as an artificial hotspot where the observations 205 for many user devices 115 are approximated to the same location. The data refiner 105 generally adjusts the normalized device count by evaluating the proportions of the total device count at the point of interest 215 that come from the user devices 115 in each DOG 125. The data refiner 105 then adds to the total count at the POI 215 if the proportions are outside an expected range. Adjusting the device counts in this way ensures that the user devices 115 in each DOG 125 are properly represented. Particularly, this ensures that the low-frequency devices 220 are accurately represented since the low-frequency devices 220 are more likely to be under or overrepresented in the raw data than the user devices 115 with higher sample frequencies.

Referring to FIG. 7, a flowchart 700 illustrates a technique for adjusting the normalized device count. The data refiner 105 performs one or more parts of the technique of the flowchart 700 when performing stage 620 in FIG. 6. At stage 705, the data refiner 105 divides the observation data into bands based on frequency of observation. In one example, the bands at stage 705 are formed by merging the DOGs 125 determined at an earlier step. For instance, the data refiner 105 organizes the user devices 115 into ten DOGs 125 during probability and normalization calculations, but combines the DOGs 125 into three larger bands at stage 705. The frequency bands at stage 705 generally include a low frequency band, a middle frequency band, and a high frequency band. As noted, the user devices 115 in the low frequency band are more likely to be misrepresented through the observations 205 than the user devices 115 in other frequency bands. Organizing the user devices 115 in this way allows the data refiner 105 to assess the representation of the user devices 115 in different frequency bands. Additionally, using just a handful of frequency bands rather than a larger amount of DOGs 125 reduces the computation complexity and avoids certain types of noise in the device counts. Specifically, low device counts in a grouping may be more susceptible to noise, and using three frequency bands creates larger groupings to avoid such noise. In practice, the approach using three frequency bands has produced reasonable device counts across each frequency band. The data refiner 105 optionally adjusts the normalized device counts using a larger number of frequency bands.

At stage 710, the data refiner 105 organizes the devices based on common evening location (CEL). Again, the CEL generally refers to the home location of the user device 115. In other words, the CEL is the location that the user device 115 returns to regularly in the evening and night hours of the day. Typically, the data refiner 105 organizes the devices by county 230 and the CEL for each user device 115 is the home county 235 for that user device 115. Organizing the devices by home county 235 accounts for various location-specific effects on the device count, such as common habits of the users in that home county 235. Alternatively, the data refiner 105 can organize the user devices 115 in another way, such as the county 230 where the user device 115 is observed and/or by a different geographic region 210 as examples.

In one version, the data refiner 105 continues to stage 715. At stage 715, the data refiner 105 determines an amount to increase the normalized device count based on the device count in the middle frequency group. The data refiner 105 considers the normalized device count in a particular POI 215. The data refiner 105 either increases the device count or does not change the device count. Alternatively, the data refiner 105 optionally decreases the device count at stage 715. The user devices 115 in the middle frequency band are typically more accurately represented than the user devices 115 in the low frequency band. Assessing the device count in the middle frequency band relative to the total device count at the POI 215 can provide insight about the user devices 115 in the low frequency band. For instance, the device count in the middle frequency band may suggest that some user devices 115 were not observed due to low observation frequency. Compared to using the high frequency band first, using the middle frequency band can allow the data refiner 105 to more gradually or carefully increase the normalized device count as a first step.

In another version, the data refiner 105 continues to stage 720 from stage 710. At stage 720, the data refiner 105 considers a combination of the middle frequency and high frequency bands for devices at the POI 215. The data refiner 105 determines an amount to increase the normalized device count based on the combined device count from the middle and high frequency bands. As noted, the user devices 115 in the higher frequency bands generally provide insight into the user devices 115 in the low frequency band. Because the user devices 115 in the high frequency band are generally the most accurately represented in the data, including the high frequency band at stage 720 generally allows the data refiner 105 to accurately account for missing user devices 115 in the low frequency band. In practice, using a combination of the middle frequency and high frequency bands rather than just the middle frequency band oftentimes results in a greater increase in the normalized device count.

The data refiner 105 then continues to stage 725. At stage 725, the data refiner 105 determines an amount to increase the normalized device count at the POI 215 based on the device count in the high frequency band. The data refiner 105 considers the normalized device count that has been modified at stage 715 and/or at stage 720. Similar to the actions at stage 715 and stage 720, the data refiner 105 either increases the normalized device count or does not change the normalized device count. Because the user devices 115 in the high frequency band are typically better represented in the observation data than the user devices 115 in the low frequency band, the data refiner 105 oftentimes increases the device count based on the high frequency band device count. Analyzing the high frequency band device count at a later step ensures that the device count is only increased if necessary. Considering the device count in the middle frequency band at stage 715 and/or at stage 720 first accounts for part of all of the device count increase. With respect to the initial increase, the data refiner 105 further increases the device count at stage 725 if the high frequency device count indicates that there are likely additional unrecorded user devices 115 in the low frequency band.

After adjusting the normalized device counts at the POIs 215, the data refiner 105 calculates a raw device factor at stage 730. The raw device factor represents the number of user devices 115 added to the normalized device count per each user device 115 with at least one observation 205. In other words, the raw device factor is the ratio of the increase in the normalized device count (i.e., the amount of increase from stage 715, stage 720, and/or stage 725) to the pre-normalized observed device count. The data refiner 105 calculates the raw device factor for the middle frequency band and the high frequency band. In one example, the raw device factor for the high frequency band is the number of user devices 115 added at stage 725 per the number of observed user devices 115 in the high frequency band. In another example, the raw device factor for the high frequency band further incorporates half of the number of user devices 115 added at stage 720. The data refiner 105 utilizes the raw device factors for various aggregating procedures. For instance, the raw device factors are used to deduplicate data.

Figure 8:
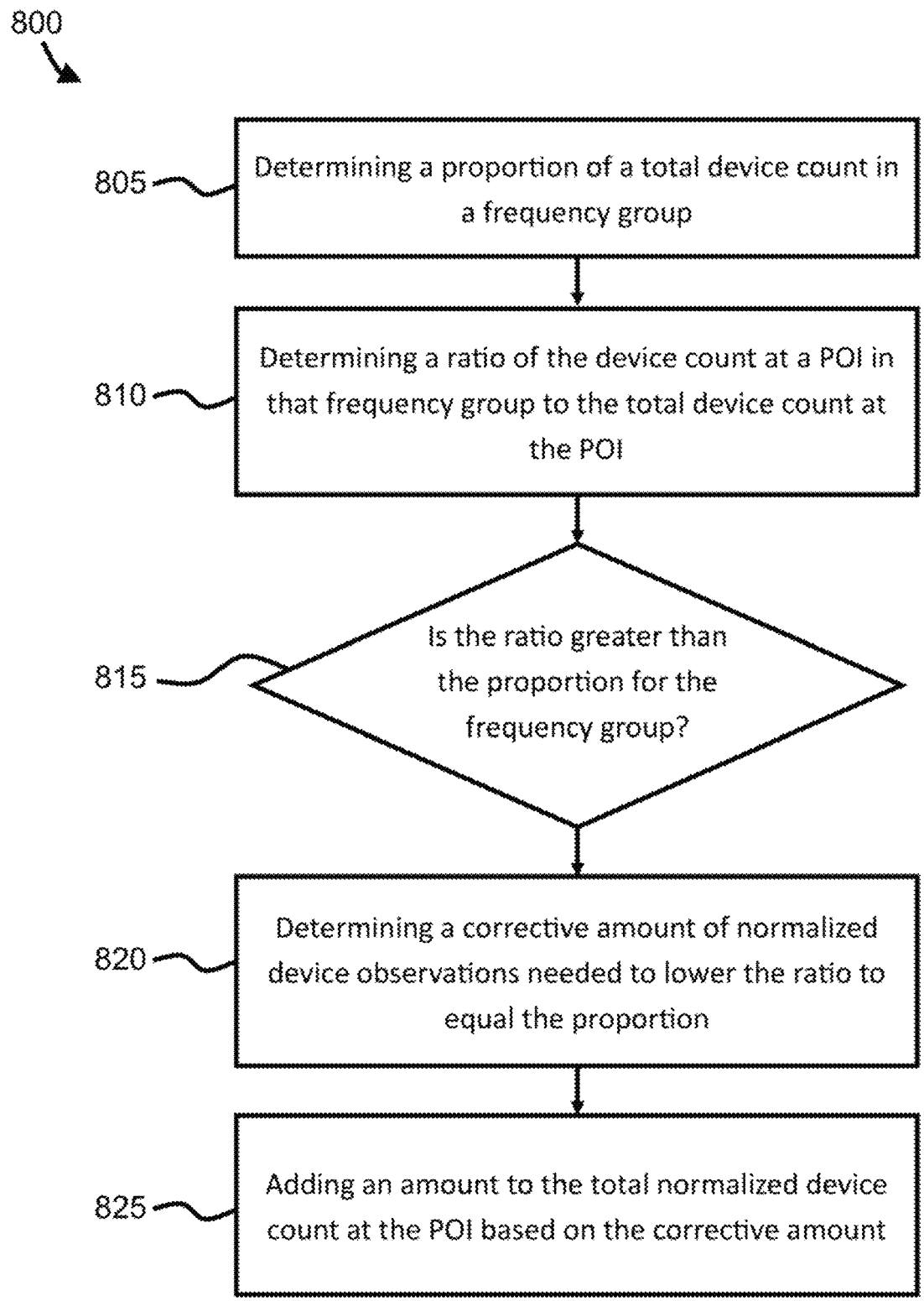
FIG. 8 is a flowchart of a technique for determining an amount to increase the normalized device count.

FIG. 8 illustrates a flowchart 800 showing technique for adjusting the normalized device count. The data refiner 105 typically performs the technique of the flowchart 800 when performing the actions at stage 715 and/or at stage 725 in FIG. 7. The flowchart 800 is described in the context of adjusting the device count at a particular POI 215. As should be appreciated, the data refiner 105 is configured to adjust the device counts at a particular POI 215, in a particular county 230, within another geographic region 210, and/or based on another location.

At stage 805, the data refiner 105 determines a proportion of the total device count that is in a particular frequency band. For example, as a part of stage 715 in FIG. 7, the data refiner 105 calculates the proportion of the device count that is from the user devices 115 in the middle frequency band. As another example, as a part of stage 725 in FIG. 7, the data refiner 105 calculates the proportion of the device count that is from the user devices 115 in the high frequency band. The data refiner 105 determines this proportion for each group of user devices 115 that shares a common home county 235 and/or other CEL. In one example, the data refiner 105 uses the raw device counts from before normalization. In another example, the data refiner 105 uses the normalized device counts to calculate the proportion. Optionally, the proportions for each frequency band are determined in a pre-processing step before normalization and/or determined by another device. The proportions generally represent target distributions of the user devices 115 among the frequency bands at various POIs 215.

At stage 810, the data refiner 105 compares the device count at a particular POI 215 that is in the given frequency band to the total normalized device count at the POI 215. The data refiner 105 determines a ratio of the user devices 115 in that frequency band to the total number of user devices 115 at the POI 215. In other words, the data refiner 105 calculates the fraction of the user devices 115 in the given frequency band at the POI 215. The device counts considered at stage 810 are typically the normalized device counts, such as the device count calculated through the technique in FIG. 6. If the total normalized device count has already been adjusted, the data refiner 105 considers the adjusted total normalized device count. For example, the data refiner 105 can adjust the device count at stage 715 in FIG. 7 and then assess the device counts again at stage 725. In this example, as a part of adjusting the device count at stage 725 in FIG. 7, the data refiner 105 calculates the ratio at stage 810 based on the adjusted total device count determined at stage 715. The data refiner 105 determines the ratio for each group of user devices 115 that shares a common home county 235 and/or other CEL. As should be appreciated, the data refiner 105 is configured to calculate the ratio for the user devices 115 at a single POI 215, in a specific county 230, and/or in a different geographic region 210.

The data refiner 105 then continues to stage 815. At stage 815, the data refiner 105 compares the ratio to the proportion for the given frequency band. While the proportion from stage 805 generally represents the distribution of the user devices 115 among the frequency bands over a larger set of the observation data, the ratio at stage 810 generally represents this distribution at a smaller scale, typically at a single POI 215. By comparing the proportion and the ratio, the data refiner 105 checks that the user devices 115 in each frequency band are appropriately accounted for at each POI 215. For example, the user devices 115 in the low frequency band at a given POI 215 may be underrepresented due to low dwell times at the POI 215 and/or other causes. Comparing the ratio at the POI 215 to the proportion allows the data refiner 105 to infer if any low frequency user devices 115 were unobserved at the POI 215. In one example, the comparison at stage 815 further allows the data refiner 105 to observe any changes to the distribution of the user devices 115 among the frequency bands that may be caused by normalization. For instance, the data refiner 105 calculates the proportion based on raw pre-normalized device counts and calculates the ratio based on the normalized device counts. Based on the comparison at stage 815, the data refiner 105 determines whether or not to increase the total normalized device count at the POI 215. Generally, the user devices 115 added to the device count are assumed to be in the low frequency band. Increasing the device count in this way allows the data refiner 105 to account for unobserved user devices 115 in the low frequency band.

If the ratio is less than or equal to the proportion, the data refiner 105 determines that the total normalized device count is appropriate. In other words, the data refiner 105 determines that the distribution of the user devices 115 is reasonable based on the comparison at stage 815. In this case, the data refiner 105 does not add any user devices 115 to the total normalized device count for the POI 215. On the other hand, if the ratio is greater than the proportion, the data refiner 105 continues to stage 820 to determine the amount of user devices 115 to add.

At stage 820, the data refiner 105 determines a corrective amount of user devices 115. The corrective amount is the amount of user devices 115 needed to increase the total normalized device count at the POI 215 such that the ratio equals the proportion. Because the ratio is greater than the proportion, adding to the total device count lowers the ratio until the ratio becomes equal to the proportion. The corrective amount represents the amount of user devices 115 added to the total device count to correct the distribution of the user devices 115 among the frequency bands at the POI 215. Typically, the data refiner 105 analyzes the device count for the high or medium frequency band in this technique. For example, the data refiner 105 performs the technique of the flowchart 800 for a medium frequency band when performing stage 715 of the flowchart 700 in FIG. 7. As another example, the data refiner 105 performs the technique of the flowchart 800 for a high frequency band when performing stage 725 of the flowchart 700 in FIG. 7. As noted, the device counts of the high and medium frequency bands are generally more accurate than the device count in the low frequency band. Therefore, determining the corrective amount based on the device count in the medium and/or high frequency band allows the data refiner 105 to accurately estimate the amount of user devices 115 missing from the low frequency device count.

The data refiner 105 then continues from stage 820 to stage 825. At stage 825, the data refiner 105 determines an amount to increase the total normalized device count for the POI 215. The amount of increase is based on the corrective amount determined at stage 820. Generally, increasing the device count at the POI 215 in this way allows the data refiner 105 to account for unobserved user devices 115 based on a larger scale distribution of the user devices 115 among the frequency bands. In one example, the amount of increase is half of the corrective amount. In other words, the normalized device count is increased by half the amount needed to equate the ratio and the proportion. In another example, the amount of increase is one third, one quarter, two thirds, three quarters, and/or another fraction of the corrective amount. By adjusting the total normalized device count only partially toward the full corrective amount, the data refiner 105 avoids overcorrecting the normalized device count. In one version, the data refiner 105 adjusts the normalized device count in multiple steps, such as at stage 715, stage 720, and/or stage 725 in FIG. 7. Increasing the normalized device count by only part of the full corrective amount allows the data refiner 105 adjust the device count gradually and incrementally. This approach can allow the data refiner 105 to more accurately account for underrepresented user devices 115 than other techniques.

Figure 9:
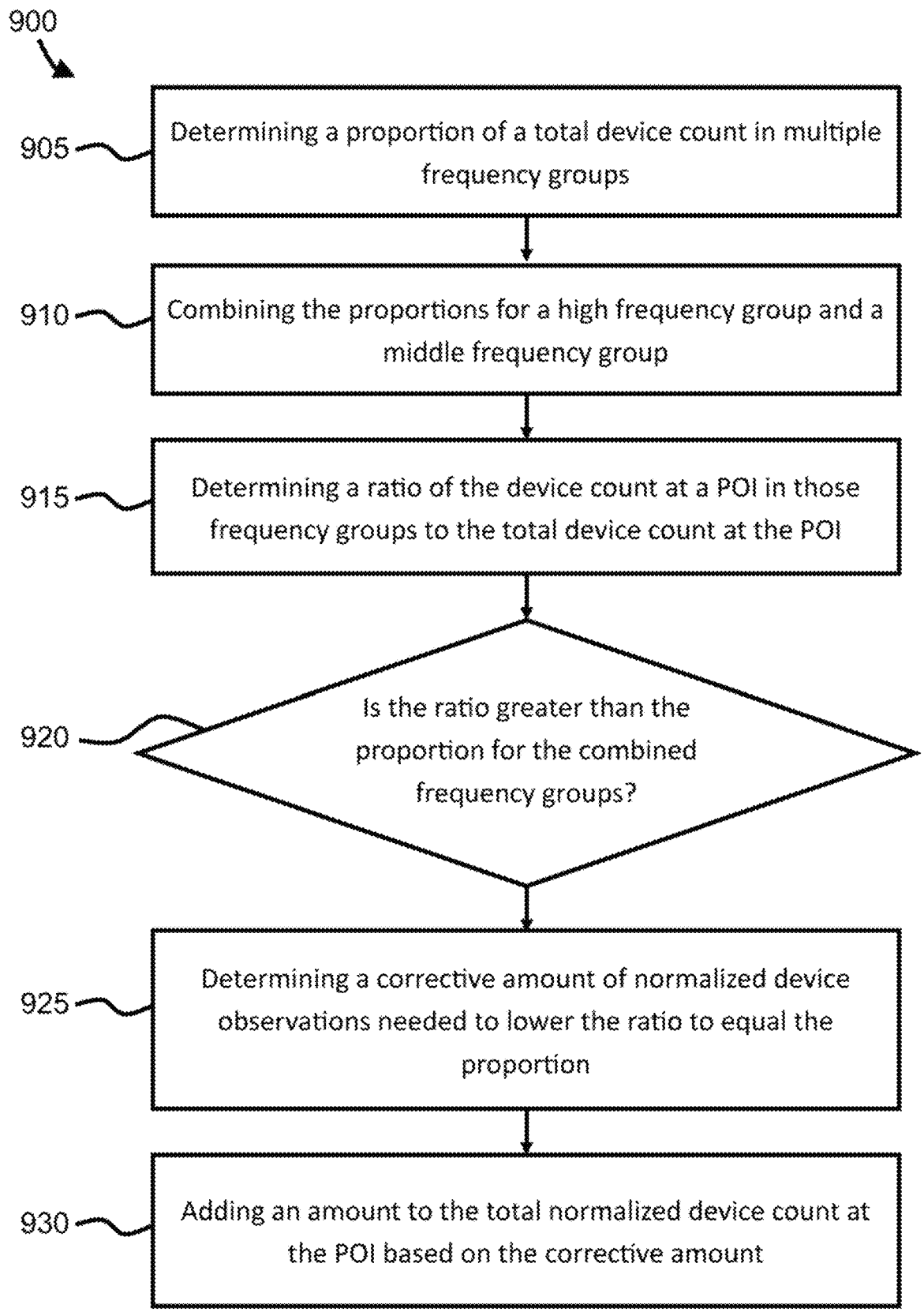
FIG. 9 is a flowchart of another technique for determining an amount to increase the normalized device count.

Referring to FIG. 9, a flowchart 900 depicts another technique for adjusting the normalized device count. The data refiner 105 typically performs the technique of the flowchart 900 when performing the actions at stage 720 in FIG. 7. The flowchart 900 is described in the context of adjusting the device count at a particular POI 215. As noted, the data refiner 105 is configured to adjust the device counts at a particular POI 215, in a particular county 230, within another geographic region 210, and/or based on another location. Further, the technique includes combining the high and middle frequency bands when the user devices 115 are arranged into three frequency bands. As should be appreciated, the data refiner 105 is configured to arrange the user devices 115 into any number of frequency bands and to perform the technique by combining any number and/or selection of frequency bands.

At stage 905, the data refiner 105 determines the proportion of the total device count that is in multiple frequency bands. For example, as a part of stage 720 in FIG. 7, the data refiner 105 calculates the proportions of the device count that is from the user devices 115 in the middle frequency band and in the high frequency band. In one example, the data refiner 105 determines the proportions based on the same calculations as at stage 805 in FIG. 8. The data refiner 105 then continues to stage 910. At stage 910, the data refiner 105 combines the proportions for the high frequency band and the middle frequency band. By combing the proportions for these bands, the data refiner 105 effectively creates a larger high frequency band. When there are three frequency bands, combining the high and middle frequency bands allows the data refiner 105 to isolate the user devices 115 in the remaining low frequency band.

At stage 915, the data refiner 105 determines the normalized device count in each of the high and middle frequency bands at a particular POI 215. The data refiner 105 determines a ratio of the combined device count in those frequency bands to the total normalized device count at the POI 215. In one example, the data refiner 105 calculates the ratio utilizing the same calculations as at stage 810 in FIG. 8. For instance, the data refiner 105 uses the same normalized device counts for the POI 215 as at stage 810, but compares the sum of the high and middle frequency band device counts to the total device count. Again, combining high and middle frequency bands effectively allows the data refiner 105 to isolate the device count in the low frequency band.

The data refiner 105 then continues to stage 920. At stage 920, the data refiner 105 compares the ratio to the proportion for the combined frequency bands. In one example, the data refiner 105 performs the same calculations at stage 920 as at stage 815 in FIG. 8. The combined proportion from stage 910 generally represents the distribution of the user devices 115 among the frequency bands over a larger set of the observation data. Conversely, the ratio from stage 915 generally represents that distribution at a smaller scale, typically at a single POI 215. By comparing the proportion and the ratio, the data refiner 105 checks that the user devices 115 in each frequency band are appropriately accounted for at each POI 215. Using the proportion and the ratio for the combined frequency bands allows the data refiner 105 to generalize some frequency bands while more closely targeting others. Specifically, combining the high and middle frequency groups allows the data refiner 105 to assess the amount of the user devices 115 that may be missing from the low frequency band. Because the high and middle frequency bands typically have more accurate device counts than the low frequency band, the data refiner 105 may not need to analyze each of these frequency bands individually.

If the ratio is less than or equal to the proportion, the data refiner 105 determines that the total normalized device count is appropriate. In other words, the data refiner 105 determines that the distribution of the user devices 115 is reasonable based on the comparison at stage 920. In this case, the data refiner 105 does not add any user devices 115 to the total normalized device count for the POI 215. On the other hand, if the ratio is greater than the proportion, the data refiner 105 continues to stage 925 to determine the amount of user devices 115 to add.

At stage 925, the data refiner 105 determines a corrective amount of user devices 115. The corrective amount is the amount of user devices 115 needed to increase the total normalized device count at the POI 215 such that the ratio equals the proportion. The corrective amount is determined in the same way as at stage 820 in FIG. 8. In one example, the data refiner 105 performs the technique of the flowchart 900 for the high and middle frequency bands when performing stage 720 of the flowchart 700 in FIG. 7. Determining the corrective amount based on the combined device counts in the middle and high frequency band allows the data refiner 105 to accurately estimate the amount of user devices 115 missing from the low frequency device count.

The data refiner 105 then continues from stage 925 to stage 930. At stage 930, the data refiner 105 determines an amount to increase the total normalized device count for the POI 215. The amount of increase is based on the corrective amount determined at stage 930. The data refiner 105 utilizes the same calculations as at stage 825 in FIG. 8. As noted, the data refiner 105 adjusts the normalized device count in multiple steps, such as at stage 715, stage 720, and/or stage 725 in FIG. 7. Through this approach, adding only a portion of the full corrective amount at stage 930 allows the data refiner 105 to more accurately and gradually adjust the normalized device count at each POI 215.

Figure 10:
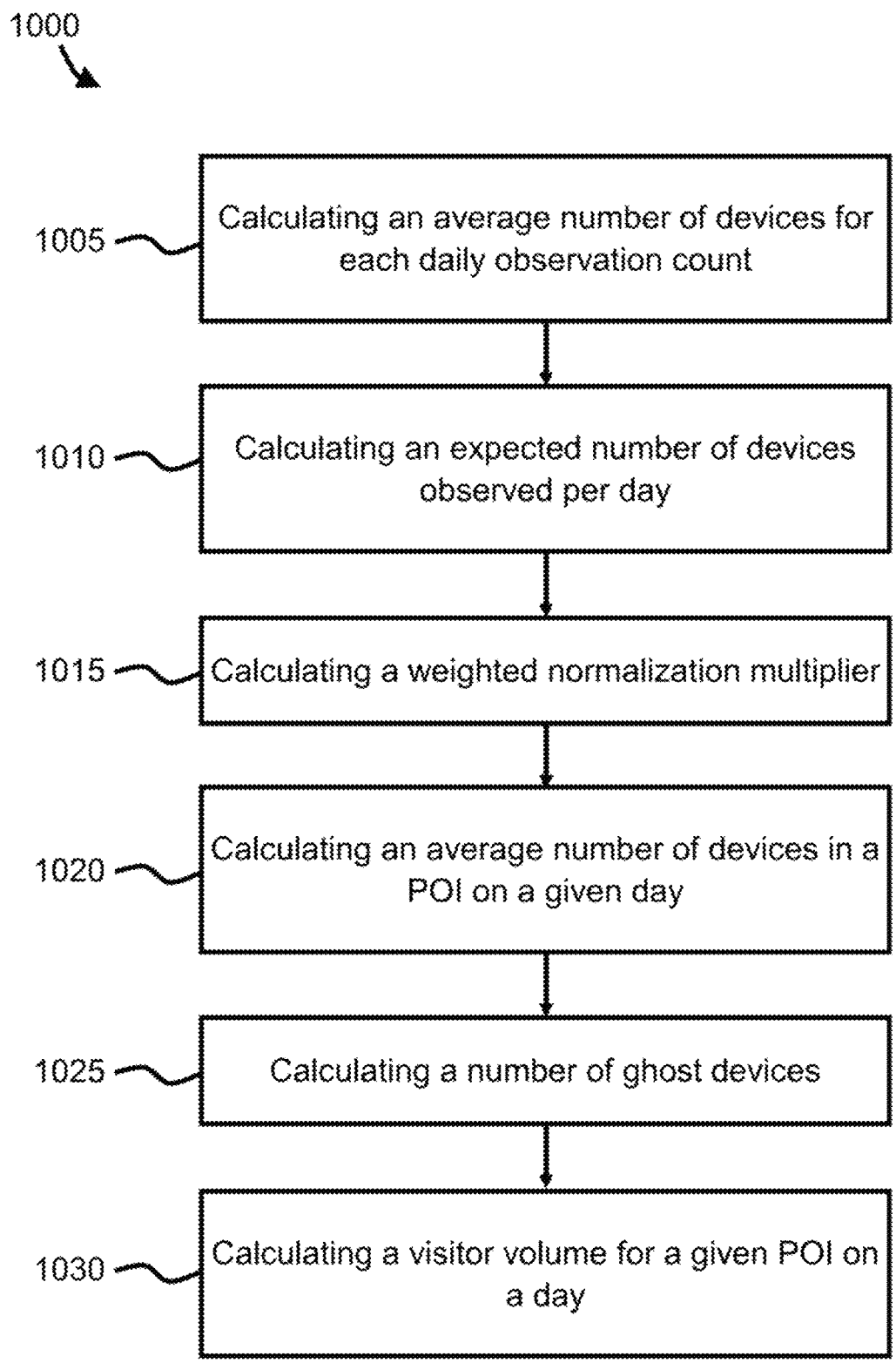
FIG. 10 is a flowchart of another technique for normalizing a device count.

FIG. 10 depicts a flowchart 1000 illustrating another technique for normalizing device counts. The technique shown in the flowchart 1000 generally involves normalizing the data using a normalization factor that is weighted based on each county 230. Further, the technique includes calculating the visitor volume at a given POI 215. In one version, the data refiner 105 performs one or more parts of the technique as a part of stage 410 and/or stage 415 in FIG. 4. The technique includes weighting the normalization factor based on sample frequency of the user devices 115. This technique inherently accounts for underrepresented user devices 115, such as those in the low-frequency group 130. The data refiner 105 is configured to utilize the technique of FIG. 10 in addition to or in place of the technique of FIG. 6. The flowchart 1000 is described in the context of normalizing data based on the counties 230. As should be appreciated, the data refiner 105 is configured to normalize the data based on different types of geographic regions 210, such using state, city, zip code, neighborhood, and/or other region-specific data. Further, the flowchart 1000 describes assessing daily device counts over the course of a month. As should be appreciated, the data refiner 105 is configured to assess the device counts for each day, week, month, or another length of time. Additionally, the data refiner 105 is configured to analyze such device counts in the context of a larger length of time, such as averaging device counts across each week, month, or year as examples.

At stage 1005, the data refiner 105 calculates an average number of user devices 115 observed. The average number of user devices 115 is a daily average based on daily device counts across a month and/or another longer period of time. The data refiner 105 typically uses long-term observation data for this technique. For instance, the data refiner 105 analyzes data that spans multiple months, years, and/or another length of time. Such data is typically stored on the long-term storage device 315 in the data refiner 105 and/or on another device. The data refiner 105 determines the average number of user devices 115 having a particular number of daily observations 205. In other words, the data refiner 105 calculates an average number of user devices 115 for each daily sample frequency. The sample frequency is discretized to the number of daily observations 205 per user device 115. In one example, the number of observations 205 for each user device 115 is simplified to the corresponding DOG 125 for that number of observations 205. Further, the data refiner 105 determines the average number of user devices 115 for each county 230 and for each month. The county 230 is typically the home county 235 for the user devices 115 being observed. The data refiner 105 utilizes these factors to provide an average number of user devices 115 for each combination of the number of daily observations 205, the county 230, and the month. As should be appreciated, the data refiner 105 is configured to calculate the average number of user devices 115 observed for any combination of factors.

At stage 1010, the data refiner 105 calculates an expected number of user devices 115 to be observed per day. The data refiner 105 determines the expected number of user devices 115 for a given combination of the county 230, the month, and the dwell time. The expected number of user devices 115 is determined by summing the expected number of devices at each sample frequency, such as for each number of observations 205 and/or for each DOG 125. In one example, the data refiner 105 calculates the expected number of devices for each sample frequency by multiplying the probability of observation and the average number of user devices 115 observed. The probability is typically determined using the same technique as at stage 610 in FIG. 6. The average number of user devices 115 is the value determined at stage 1005 for the given sample frequency, county 230, and month. By summing the expected device count for each sample frequency, the data refiner 105 inherently accounts for differences in observation caused by sample frequency. In other words, the data refiner 105 weights the contribution to the expected device count from each group of user devices 115 based on sample frequency.

The data refiner 105 then continues to stage 1015. At stage 1015, the data refiner 105 calculates a weighted normalization multiplier. The data refiner 105 calculates the weighted multiplier for each for each county 230. The county 230 is typically the home county 235 for a group of user devices 115. The normalization multiplier generally scales the device count by the population for the county 230. In one example, the data refiner 105 uses the same technique and/or the same population data as used at stage 605 in FIG. 6. For instance, the weighted normalization multiplier is calculated using census population data for each county 230. Using the population to normalize the device counts generally accounts for various effects on the recorded number of user devices 115 from a given home county 235 without targeting specific causes. For example, the representation of the user devices 115 in the observation data can change based on local data privacy laws, local population habits, and/or other factors specific to a given home county 235. Weighting based on the home county 235 allows the data refiner 105 to normalize device counts more accurately based on differences between the user devices 115 from various home counties 235. In one example, the weighted normalization multiplier is calculated by dividing the population of the county 230 by the expected device count calculated at stage 1010. Therefore, the data refiner 105 calculates a weighted normalization multiplier for each combination of the county 230, the month, and the dwell time.

In another version, the data refiner 105 calculates the weighted normalization multiplier on a daily basis rather than monthly. Instead of calculating the average number of devices at stage 1005, the data refiner 105 calculates the device count given the combination of the day, the home county 235 of the user devices 115, and the number of observations 205 in the day. The home county 235 assigned to each user device 115 is optionally still determined on a monthly basis. Then at stage 1010, the data refiner 105 calculates the expected number of user devices 115 for a given home county 235, dwell time, and day. In this case, the expected number of user devices 115 is calculated based on the daily device count from this version of stage 1005. To find the weighted normalization factor, the data refiner 105 then performs the calculation at stage 1015 using the daily expected number of user devices 115. Using the daily approach rather than the monthly approach allows the data refiner 105 to account for changes in the device counts that occur throughout the month. For example, daily device counts may change significantly throughout the month. In such cases, daily normalization multipliers may more accurately normalize the observation data for each day compared to monthly normalization multipliers.

At stage 1020, the data refiner 105 determines number of user devices 115 observed at a particular POI 215. The data refiner 105 determines the device count on a particular day for each home county 235 of the user devices 115. Therefore, the data refiner 105 provides a device count for each combination of the home county 235, the day, and the POI 215. The data refiner 105 then computes a number of ghost devices at stage 1025. The ghost devices represent the user devices 115 that are present at the POI 215 but might not be observed. By calculating the number of ghost devices, the data refiner 105 accounts for underrepresented user devices 115, such as the user devices 115 in one of the low-frequency groups 130. In one example, the number of ghost devices is calculated by multiplying the weighted normalization factor from stage 1015 and the number of observed user devices 115 from stage 1020. The number of ghost devices is determined for each combination of the home county 235, the day, and the POI 215. The data refiner 105 optionally filters the user devices 115 by visitor or resident at stage 1025. For example, the data refiner 105 marks visitors as the user devices 115 from the home counties 235 that are different from the county 230 where the POIs 215 is located. The data refiner 105 marks residents as the user devices 115 that are from the same county 230 that contains the POIs 215.

At stage 1025, the data refiner 105 calculates a visitor volume for the POI 215 for the day. The visitor volume generally represents the number of user devices 115 that come to the POI 215 and have home counties 235 in a different county 230 than the POI 215. The data refiner 105 calculates the visitor volume by summing the number of ghost devices from a given home county 235 for each county 230 outside the county 230 of the POI 215. Calculating the visitor volume this way provides a daily visitor volume for a particular POI 215. The data refiner 105 optionally computes a monthly visitor volume by summing the daily visitor volume counts. Generally, knowing the visitor volume provides valuable insight into the observation data for various POIs 215 and counties 230. In some instances, visitors have different behaviors than residents, such as being prone to be observed less frequently. Determining visitor volume allows the data refiner 105 to normalize the observation data by accounting for such differences. In one example, the data refiner 105 adjusts the device counts determined at stage 1005 and/or at stage 1020 based on the lower observation frequency of visitors.

In one version, the data refiner 105 further removes duplicate observations 205 that are included in the visitor device count for more than one geographic area. For instance, the data refiner 105 removes duplicate visitor counts that may occur on the boundary between two counties 230, POIs 215, and/or other areas. In one example, the data refiner 105 utilizes the raw device factor calculated at 703 in FIG. 7 when deduplicating the visitor volume. The data refiner 105 deduplicates the visitor volume by evaluating the observations 205 for a particular user device 115 in the POIs 215 within a given county 230 or boundary. At each POI 215, the data refiner 105 minimizes, maximizes, or averages the weighted normalization factor for the day for the observations 205 from that user device 115. By modifying the weighted normalization factor in this way, the data refiner 105 accounts for each user device 115 at only one POI 215 within the county 230 or at the boundary. The data refiner 105 uses this technique for each user device 115 to ensure that each user device 115 is counted in the visitor volume only once.

Figure 11:
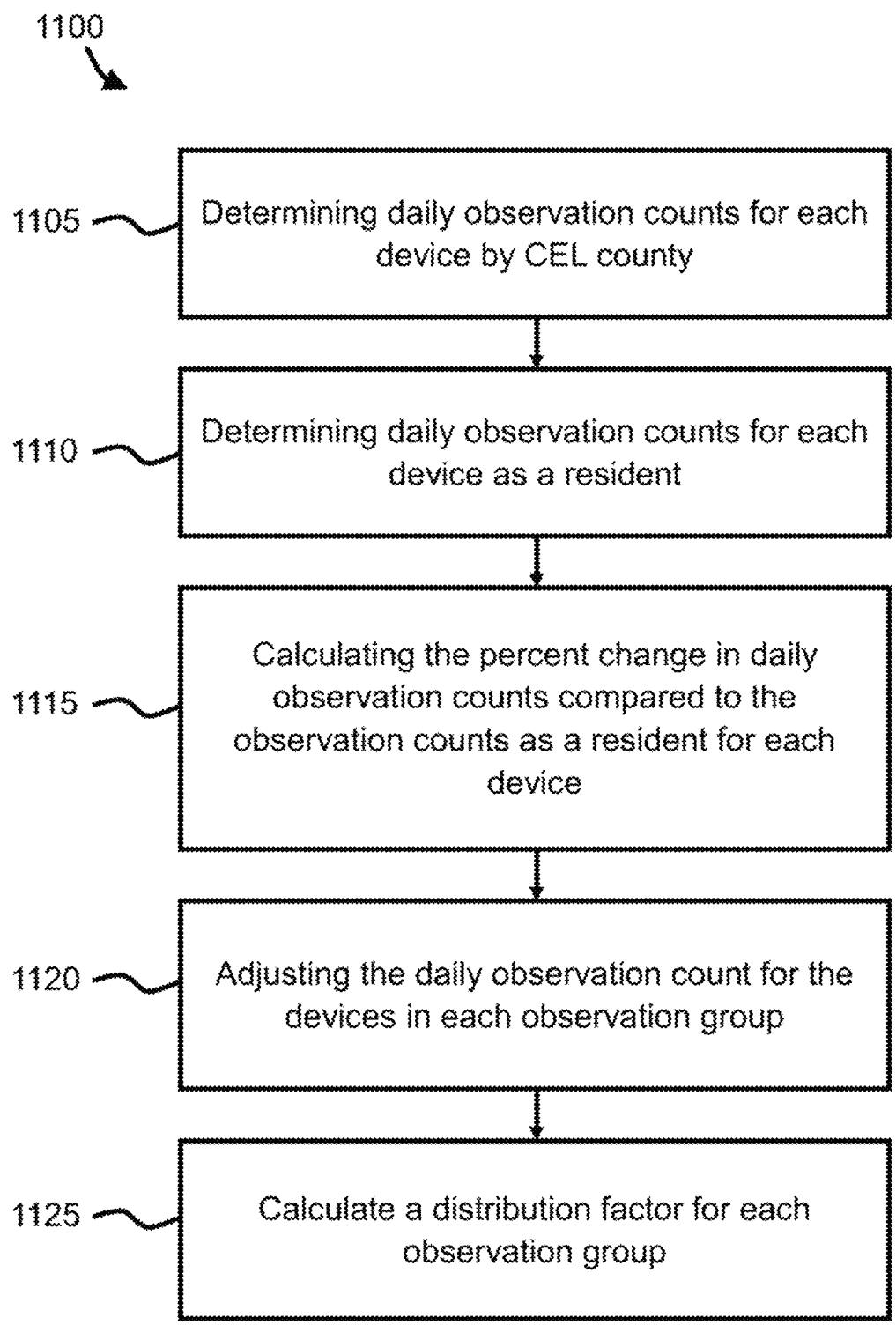
FIG. 11 is a flowchart of a technique for adjusting a device count based on a number of visitors.

FIG. 11 depicts a flowchart 1100 illustrating a technique for adjusting the device count based on the number of visitors. The data refiner 105 performs one or more parts of this technique as a part of stage 420 in FIG. 4. At stage 1105, the data refiner 105 determines the daily number of observations 205 for each user device 115. The data refiner 105 determines the observation counts for each CEL of the user devices 115, such as for each home county 235. In one example, the data refiner 105 determines the daily counts for every day in a month. In another example, the data refiner 105 determines the daily counts within a longer period, such as across multiple months. After determining the total number of observations 205 for the user devices 115 by each home county 235, the data refiner 105 continues to stage 1110. At stage 1110, the data refiner 105 determines the daily number of observations 205 for each user device 115 that occur in the home county 235 of that user device 115. In other words, the data refiner 105 determines the number of times each user device 115 is observed as a resident. In one version, the data refiner 105 utilizes one or more calculations from the flowchart 1000 in FIG. 10. For example, the data refiner 105 performs part of the calculations from stage 1020, stage 1025, and/or stage 1030 in FIG. 10 as a part of stage 1105 and/or stage 1110 in this technique.

The data refiner 105 then continues to stage 1115. At stage 1115, the data refiner 105 calculates a percent change in the daily number of observations 205 compared to the number of observations 205 for each user device 115 as a resident. Generally, the data refiner 105 compares the total daily observation count from stage 1105 to the observation count as a resident from stage 1110 for each user device 115. Comparing the observation counts as a resident and as a visitor allows the data refiner 105 to analyze effects on observation frequency that may be caused by the user device 115 being a visitor. In practice, it has been observed that user devices 115 have lower observation frequency in the visitor counties 240 than in the home county 235 of the user device 115. This damping effect on observation frequency was significant enough to require correction. Therefore, the data refiner 105 is configured to adjust the number of user devices 115 and/or number of observations 205 based on the comparison at stage 1115. Further, it has been observed that this damping effect varies across different days and/or changes based on the daily observation count for the user device 115. The data refiner 105 therefore compares the residential and visitor observation counts for each user device 115 on a daily basis to account for daily changes in the damping effect.

At stage 1120, the data refiner 105 adjusts the daily observation count for the user devices 115 in each DOG 125. As noted, the user devices 115 are organized into the DOGs 125 based on the number of daily observations 205. Based on the comparison at stage 1115, the data refiner 105 adjusts the daily observation counts and reorganizes the user devices 115 into the DOGs 125. Reorganizing the user devices 115 into new DOGs 125 allows the data refiner 105 to quantify the damping effect on observation frequency. At stage 1125, the data refiner 105 then calculates a distribution factor for each DOG 125. The distribution factors represent the percentage of the user devices 115 that shift from one DOG 125 to another DOG 125 after the daily observation counts are adjusted. In one example, the data refiner 105 computes a table of distribution factors that include percentages for the number of user devices 115 that remain in each DOG 125 and the number of user devices 115 that transfer from each DOG 125 to every other DOG 125. The data refiner 105 applies the distribution factors to the DOGs 125 during normalization. For example, the data refiner 105 uses the distribution factors to adjust the distribution of the user devices 115 among the DOGs 125 when calculating the observation probability of the user devices 115. Specifically, the data refiner 105 applies the distribution factors this way before calculating probability at stage 610 in FIG. 6, at stage 1010 in FIG. 10, and/or at other parts of the normalization techniques. In one example, the data refiner 105 calculates the distribution factors on a monthly basis and uses the same distribution factors to redistribute the user devices 115 each day in the month. In another example, the data refiner 105 calculates the distribution factors on a daily basis or based on another time frame. Using the distribution factors allows the data refiner 105 to account for reduced visitor observation frequency at various points in the normalization process.

In some cases, the damping effect for observation counts changes minimally or not at all with respect to distance from the home county 235. In those cases, the data refiner 105 accurately accounts for the damping effect for each user device 115 based on classifying the observations 205 simply as visitor or resident. In other cases, the damping effect is more pronounced as the user device 115 moves further away from the home county 235. In those cases, the data refiner 105 accounts for the distance of the observation 205 from the home county 235 during normalization. For instance, the data refiner 105 interpolates between normalization for the user devices 115 as residents and as visitors based on the distance from the CEL. In other words, for the user devices 115 that are far from the CEL, the data refiner 105 adjusts the device counts as visitors, such as through the technique of FIG. 11. For the user devices 115 that are close to the CEL, the data refiner 105 normalizes the device counts as residents. For the user devices 115 located in between, the data refiner 105 smoothly mixes the normalization techniques based on distance from the CEL. In one version, the data refiner 105 scales the visitor damping factor based on distance from the CEL.

While the technique of FIG. 11 is generally described using the counties 230, the data refiner 105 is configured to account for visitor damping based on other types of geographic regions 210 and/or larger regions encompassing multiple geographic regions 210. In one version, the data refiner 105 accounts for visitor damping by organizing the data based on custom geographic cells that are similar in size to the counties 230. Further, the data refiner 105 is configured account for visitor damping on a larger scale by analyzing visitor damping across a larger region than just individual counties 230 or other geographic regions 210. In one example, the data refiner 105 calculates a broader regional damping factor by averaging the visitor damping factor from geographic regions 210 within the larger region. For instance, the data refiner 105 analyzes the visitor damping effects from the geographic regions 210 in a state and/or a multi-state region. Analyzing visitor damping across larger regions allows the data refiner 105 to account for regional variations in visitor damping. Normalizing data based on broader regional effects allows the data to be reliable on a wider scale beyond the more localized data from individual geographic regions 210.

Figure 12:
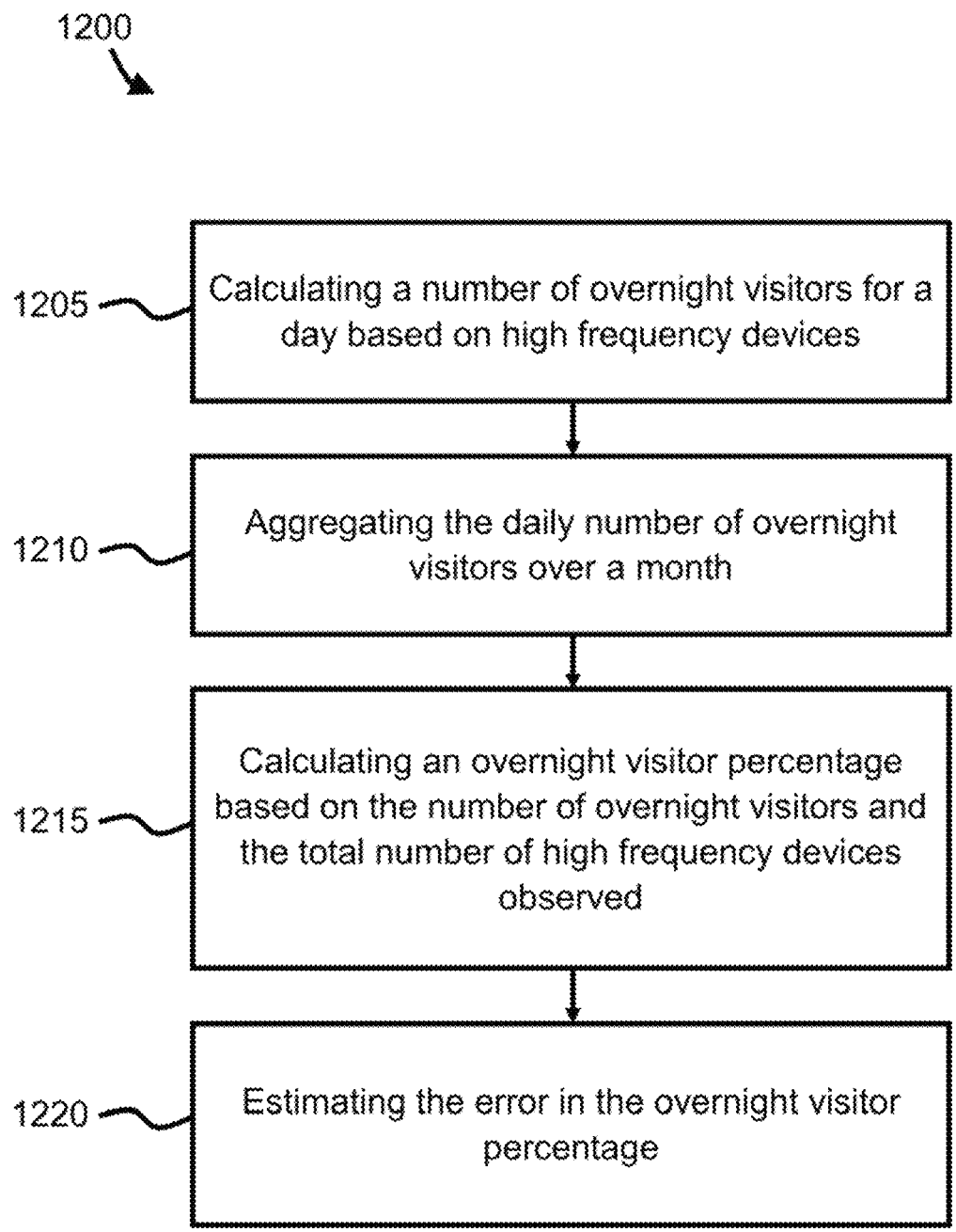
FIG. 12 is a flowchart of a technique for calculating an overnight visitor percentage.

Referring to FIG. 12, a flowchart 1200 depicts a technique for calculating an overnight visitor percentage. As noted, some user devices 115 are physically at a given POI 215 overnight and across multiple days. But if those user devices 115 are observed less frequently, the data refiner 105 may determine those user devices 115 stayed at the POI 215 for the only a single day. Knowing which user devices 115 are overnight visitors can be valuable because such user devices 115 generally interact with the POI 215 in a meaningful way. For example, overnight visitors are generally likely to visit attractions and/or attend events occurring at the POI 215. In contrast, single day visitors generally do not interact with the POI 215 in a meaningful way. Overnight visitors might be incorrectly counted as single day visitors even if those overnight visitors interact with the POI 215 on multiple days. The technique allows the data refiner 105 to correct for user devices 115 that are inaccurately observed for only a single day at the POI 215.

At stage 1205, the data refiner 105 calculates the number of overnight visitors on a given day. Again, the overnight visitors are the user devices 115 that are at the POI 215 overnight across multiple days. The data refiner 105 calculates this number based on observations 205 from the high-frequency devices 225. Because the high-frequency devices 225 are more frequently observed, the observations 205 more accurately represent the actual location of those user devices 115 over a period of time. Using the high-frequency devices 225 to determine the overnight visitor count is therefore more reliable than using the observations 205 from all the user devices 115. The data refiner 105 then aggregates the overnight visitor counts over a month and/or another period of time. Aggregating the counts over a month allows the data refiner 105 to analyze the typical overnight visitor behavior and mostly ignore days that are outliers. Further, aggregating the overnight visitor counts over a longer period avoids issues caused by low device counts, such as in POIs 215 that have few visitors in a day. Using the observations 205 from the high-frequency devices 225 also helps to avoid this issue.

At stage 1215, the data refiner 105 calculates an overnight visitor percentage based on the aggregated number of overnight visitors and the total number of high-frequency devices 225 observed over the month. The overnight visitor percentage is generally the fraction of the total number of high-frequency devices 225 that are overnight visitors. In an alternate version, the data refiner 105 calculates a daily ratio between the overnight visitor count and the number of high-frequency devices 225. The data refiner 105 then calculates the overnight visitor percentage by averaging the daily ratios across the month. Again, the overnight visitor percentage is based on the high-frequency devices 225 due to the reliability of the device counts. The data refiner 105 uses the overnight visitor percentage as an estimate for the user devices 115 in all the DOGs 125. The overnight visitor percentage is then applied to all the user devices 115 across the given month. In this way, the data refiner 105 normalizes the device counts based on overnight or full day visitor status.

In one version, the data refiner 105 further estimates the error in the overnight visitor percentage at stage 1220. The data refiner 105 estimates the error by evaluating how accurately the high-frequency devices 225 represent the whole of the user devices 115. In one example, the data refiner 105 computes the percentage of the total amount of user devices 115 that are high-frequency devices 225. The data refiner 105 determines that the overnight visitor percentage has an error within a certain threshold based on the percentage of user devices 115 that are high-frequency devices 225. For instance, if the number of observed high-frequency devices 225 is high enough, the data refiner 105 determines that the overnight visitor percentage has an error within 5%, 3%, or another percent. The data refiner 105 optionally sets device count thresholds for the high-frequency devices 225 that correspond to various levels of error in the overnight visitor percentage. In another example, the data refiner 105 assumes that the overnight visitor percentage is 50%. Such an assumption allows the data refiner 105 to avoid under-estimating the device count threshold. Computing the error allows the data refiner 105 to optionally display an error percentage and/or flag the observation data. This allows the data refiner 105 to provide additional context about the observation data after adjusting the overnight visitor counts.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Cellular Device" generally refers to a device which sends or receives data, and/or sends or receives telephone calls using a cellular network. Cellular devices may thus be characterized as nodes in a communications link operating as an originating and/or final receiving node. A cellular device transmits to and receives from a cellular transceiver located in the cell (e.g. at a base unit or "cell tower.") Radio waves are generally used to transfer signals to and from the cellular device on a frequency that is specific (but not necessarily unique) to each cell. A cellular device may include a computer with memory, processor, display device, input/output devices, and so forth, and thus may be used as, and referred to as, a personal computing device.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database", "Knowledge Base", "Data Store", or "Data Repository" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS. Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others. Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA. The database and the DBMS software may also be referred to collectively as a "database". Similarly, the term "database" may also collectively refer to the database, the corresponding DBMS software, and a physical computer or collection of computers. Thus, the term "database" may refer to the data, software for managing the data, and/or a physical computer that includes some or all of the data and/or the software for managing the data.

"Geo-fence" generally refers to a virtual boundary generated for a real geographical area. The virtual boundary defined by a geo-fence may be monitored using a positioning system and/or any other form of location-based service.

"Geolocation" or "Geopositioning" generally refers identifying the location of, or the location itself of, a "real-world" or "physical" geographic location or location of an object, such as a position on the globe, the position of a topographical feature, a building, a particular source of electromagnetic radiation, a mobile phone or a network-connected computer. Thus geolocation may be used as a verb referring to the practice of assessing the physical location, or in the noun form as the actual assessed location itself. In this usage, geolocation can refer to the latitude and longitude coordinates of a particular location as defined by ISO/IEC 19762-5:2008. Geolocation is closely related to the use of positioning systems such as the Global Positioning System (GPS) and may include determining a recognizable location coordinate (e.g., a street address) rather than just a set of geographic coordinates. A geolocation/geopositioning module, engine, or device may use any suitable positioning system or positioning technology. For example a geolocation module may use radio frequency (RF) location methods, such as Multilateration or Time Difference Of Arrival (TDOA) to geolocate an object. GPS is an example of a TDOA geolocation system. TDOA systems often utilize mapping displays or other geographic information system. When a GPS signal is unavailable, geolocation modules may use cellular signal data associated with a mobile device obtained from cell towers to triangulate the approximate position of the mobile device, a method that may not be as accurate as GPS. This is in contrast to earlier radiolocation technologies, for example Direction Finding where a line of bearing to a transmitter is achieved as part of the process. A geolocation module or engine may also rely on internet and computer geolocation that may be performed by associating a geographic location with the Internet Protocol (IP) address, MAC address, RFID, hardware embedded article/production number, embedded software number (such as UUID, Exif/IPTC/XMP or modern steganography), invoice, Wi-Fi positioning system, device fingerprint, canvas fingerprinting or device GPS coordinates, or other, perhaps self-disclosed information. Network geolocation may work by automatically looking up an IP address on a WHOIS service and retrieving the registrant's physical address. IP address location data can include information such as country, region, city, postal/zip code, latitude, longitude and time zone. Deeper data sets can determine other parameters such as domain name, connection speed, ISP, language, proxies, company name, Designated Market Area (DMA), Metro Survey Areas (MSA), North American Industry Classification System (NAICS) codes, and home/business.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Mobile Device" generally refers to a piece of portable electronic equipment that can connect to a network such as a wireless network, a mobile network, and/or the internet. For instance, a mobile device can include a smartphone or tablet computer.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11 (a), 802.11 (b), 802.11 (g), or 802.11 (n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Operatively Coupled" generally refers to a connection where at least two devices and/or structures are directly or indirectly connected to communicate with one another, be secured together, and/or function together. For instance, the devices can be connected through a wired and/or wireless connection in order to exchange data, commands, and/or other types of information. The devices can be directly connected together or indirectly connected together through a third-party device. In one case, electrical current can flow between the devices through electrically conductive wire, and in other cases, other types of electromagnetic radiation, such as visible light and radio waves, can be exchanged through various media, such via fiber optic cable. When operatively coupled, the devices and/or structures can be physically connected to one another via a direct connection or an indirect connection, such as via fasteners, adhesives, and/or mechanical linkages, to name just a few examples.

"Or" generally refers to a conjunction that is indicative of two or more alternatives. In other words, the word "or" connects words, phrases, and/or clauses that offer different possibilities. Usually, but not always, the word "or" only appears before the last alternative in a series of alternatives.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Satellite Navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation. Some of examples of satellite navigation systems include global positioning systems such as GPS and GLONASS as well as global positioning systems under development such as Galileo. A satellite navigation system may also be a regional positioning system such as BeiDou, NAVIC, and QZSS.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 data refiner
110 network
115 user device
120 third-party data broker
125 device observation group
130 low-frequency group
135 high-frequency group
200 map
205 observation
210 geographic region
215 point of interest
220 low-frequency device
225 high-frequency device
230 county
235 home county
240 visitor county
305 processor
310 memory
315 long-term storage device
320 networking device
400 flowchart
405 stage
410 stage
415 stage
420 stage
425 stage
500 flowchart
505 stage
510 stage
515 stage
520 stage
600 flowchart
605 stage
610 stage
615 stage
620 stage
700 flowchart
705 stage
710 stage
715 stage
720 stage
725 stage
730 stage
800 flowchart
805 stage
810 stage
815 stage
820 stage
825 stage
900 flowchart
905 stage
910 stage
915 stage
920 stage
925 stage
930 stage
1000 flowchart
1005 stage
1010 stage
1015 stage 1020 stage
1025 stage
1030 stage
1100 flowchart
1105 stage
1110 stage
1115 stage
1120 stage
1125 stage
1200 flowchart
1205 stage
1210 stage
1215 stage
1220 stage

What is claimed is:

1. A method, comprising:
receiving geospatial data of user devices;
wherein the geospatial data includes locations of the user devices recorded at one or more points in time;
correcting the geospatial data to account for undercounted user devices;
calculating probabilities of the user devices being observed at a point of interest (POI);
calculating a normalization factor based on population data for a geographic area and the number of user devices observed in the geographic area;
determining a normalized device count at the POI based on the normalization factor and the probabilities;
wherein the normalized device count represents a realistic number of users physically present at the POI;
determining a number of visitor devices at the POI; and
adjusting the normalized device count based on the number of visitor devices.

2. The method of claim 1, further comprising:
organizing the user devices into groups based on observation frequencies of the user devices;
wherein the observation frequency is based on a number of times the user device is observed in the geospatial data in a given period of time; and
wherein the probabilities are calculated based on the observation frequency groups of the user devices.

3. The method of claim 2, further comprising:
determining an average number of user devices observed for each observation frequency group;
calculating an expected number of user devices to be observed in the given period of time; and
weighting the normalization factor for each observation frequency group based on expected number of user devices.

4. The method of claim 3, further comprising:
determining a home region for each user device;
wherein the average number of user devices is determined for each home region of the user devices;
wherein the expected number of user devices is determined for each home region of the user devices; and
wherein the normalization factor is weighted for each home region of the user devices.

5. The method of claim 4, further comprising:
calculating a number of ghost devices based on the normalization factor;
wherein the number of ghost devices represents a number of user devices at the POI that are not observed in the geospatial data; and
determining the number of visitor devices at the POI based on the number of ghost devices.

6. The method of claim 5, further comprising:
summing the number of ghost devices for each home region outside the geographic region that contains the POI; and
wherein the number of ghost devices is calculated for each home region of the user devices.

7. The method of claim 2, further comprising:
determining a home region for each user device;
determining a number of home observations for each user device that is observed in the home region of that user device;
determining a number of total observations for each user device;
comparing the number of home observations to the total number of observations for the user devices;
calculating a visitor dampening factor based on a change in the number of total observations relative to the number of home observations for the user devices; and
wherein the normalized device count is adjusted based on the visitor dampening factor.

8. The method of claim 7, further comprising:
calculating a distribution factor for each observation frequency group; and
adjusting the number of user devices in each observation frequency group based on the distribution factors.

9. The method of claim 1, further comprising:
normalizing a number of overnight visitors using an overnight visitor percentage; and
wherein the overnight visitor percentage is based on an aggregated number of overnight visitors over a period of time.

10. A method, comprising:
receiving geospatial data of user devices;
wherein the geospatial data includes locations of the user devices recorded at one or more points in time;
correcting the geospatial data to account for undercounted user devices;
organizing the user devices into groups based on observation frequencies of the user devices;
wherein each observation frequency is based on a number of times the user device is observed in the geospatial data in a given period of time;
determining a dwell time for the user devices at a point of interest (POI);
wherein the dwell time represents an amount of time that the user devices are observed at the POI within the geospatial data;
calculating probabilities of the user devices being observed at the POI based on the dwell times and the observation frequencies;
determining a normalized device count at the POI based on the probabilities; and
wherein the normalized device count represents a realistic number of users physically present at the POI.

11. The method of claim 10, further comprising:
calculating a normalization factor based on population data for a geographic area and the number of user devices observed in the geographic area;
wherein the geographic area contains the POI;
wherein the probability is determined for each user device in the geographic area; and
wherein the normalized device count is calculated based on the normalization factor for the geographic area.

12. The method of claim 11, further including:
determining an average number of user devices observed for each observation frequency group;
calculating an expected number of user devices to be observed in the given period of time; and weighting the normalization factor for each observation frequency group based on expected number of user devices.

13. The method of claim 12, further comprising:
determining a home region for each user device;
wherein the average number of user devices is determined for each home region of the user devices;
wherein expected number of user devices is determined for each home region of the user devices; and
wherein the normalization factor is weighted for each home region of the user devices.

14. The method of claim 10, further comprising:
determining a probability fit function that varies with dwell time and observation frequency of the user devices;
wherein the probabilities are calculated using the probability fit function;
wherein the probability fit function is determined based on historic geospatial data of the user devices selected from multiple past dates;
organizing the user devices from the historic geospatial data into groups based on observation frequency;
determining dwell times for the user devices in the historic geospatial data; and
fitting the probability fit function to the historic geospatial data based on the observation frequency groups and the dwell times.

15. The method of claim 14, wherein the probability fit function is an interpolation of multiple functions that vary with dwell time and observation frequency of the user devices.

16. The method of claim 10, further comprising:
organizing the user devices into frequency bands based on the observation frequencies;
determining a proportion of a total device count in at least one of the frequency bands for the user devices in a geographic area that contains the POI;
calculating a ratio between the number of user devices in the frequency band and the normalized device count for the user devices at the POI;
comparing the proportion to the ratio; and
increasing the normalized device count at the POI based on the difference between the ratio and the proportion.

17. The method of claim 16, further comprising:
calculating a corrective number of devices;
wherein the corrective number of devices is a number of user devices added to the normalized device count at the POI that causes the ratio to equal the proportion; and
wherein the normalized device count at the POI is increased by an amount less than the corrective number of devices.

18. The method of claim 16, wherein the proportion is calculated for a combination of the user devices in a high frequency band and a middle frequency band; and wherein the ratio is calculated for the combination of the user devices in the high frequency band and the middle frequency band at the POI.

19. The method of claim 10, further comprising:
determining a number of visitor devices at the POI; and
adjusting the normalized device count based on the number of visitor devices.

20. The method of claim 10, further comprising:
normalizing a number of overnight visitors using an overnight visitor percentage; and
wherein the overnight visitor percentage is based on an aggregated number of overnight visitors over a period of time.

* * * * *